（12） United States Patent
Zhang et al.

(10) Patent No.: US 12,321,546 B2
(45) Date of Patent: Jun. 3, 2025

(54) TOUCH DISPLAY DEVICE AND DRIVING METHOD FOR THE TOUCH DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yinlong Zhang, Beijing (CN); Zhihua Sun, Beijing (CN); Wenpeng Ma, Beijing (CN); Liangliang Zhao, Beijing (CN); Yanping Liao, Beijing (CN); Xibin Shao, Beijing (CN); Jiantao Liu, Beijing (CN); Xiaofeng Yin, Beijing (CN); Kaiming Shi, Beijing (CN); Jinling Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/771,940

(22) PCT Filed: Jun. 18, 2021

(86) PCT No.: PCT/CN2021/100966
§ 371 (c)(1),
(2) Date: Dec. 22, 2022

(87) PCT Pub. No.: WO2022/261952
PCT Pub. Date: Dec. 22, 2022

(65) Prior Publication Data
US 2024/0184396 A1   Jun. 6, 2024

(51) Int. Cl.
*G06F 3/041* (2006.01)
(52) U.S. Cl.
CPC .................. *G06F 3/04166* (2019.05)
(58) Field of Classification Search
CPC ................................... G06F 3/04166
See application file for complete search history.

(56) References Cited

U.S. PATENT DOCUMENTS

| 8,766,950 B1 | 7/2014 | Morein et al. |
| 2014/0253525 A1 | 9/2014 | Munechika |
| | (Continued) | |

FOREIGN PATENT DOCUMENTS

| CN | 104036737 A | 9/2014 |
| CN | 104516604 A | 4/2015 |
| | (Continued) | |

*Primary Examiner* — Sejoon Ahn
(74) *Attorney, Agent, or Firm* — Raj S. Dave; Davé Law Group, LLC

(57) ABSTRACT

The present disclosure relates to a touch display device and a driving method for the touch display device. The touch display device comprises data lines, gate lines, pixel electrodes located within display areas defined by the data lines and the gate lines, and a driving circuit. The driving circuit is configured to provide a first display data signal to the data lines during a display stage of the touch display device, and is configured to provide a second display data signal to the data lines during a predetermined period adjacent to the display stage within a touch stage of the touch display device, and provide an off-signal to the gate lines during the predetermined period such that the second display data signal is not provided to the pixel electrodes.

20 Claims, 11 Drawing Sheets

(56) References Cited

U.S. PATENT DOCUMENTS

| | | |
|---|---|---|
| 2015/0097817 A1 | 4/2015 | Chung |
| 2015/0161963 A1 | 6/2015 | Kang et al. |
| 2015/0161964 A1 | 6/2015 | Kang et al. |
| 2017/0123582 A1* | 5/2017 | Kim ..................... G09G 3/2092 |
| 2017/0242529 A1 | 8/2017 | Park et al. |
| 2018/0024677 A1 | 1/2018 | Kim et al. |
| 2018/0046275 A1* | 2/2018 | Haran .................. G06F 3/04166 |
| 2018/0046295 A1* | 2/2018 | Weng ................ G02F 1/133514 |
| 2018/0046303 A1* | 2/2018 | Weng ..................... G06F 3/0412 |
| 2018/0046306 A1* | 2/2018 | Lin ....................... G06F 3/0445 |
| 2018/0046309 A1* | 2/2018 | Singh .................... G06F 3/0446 |
| 2019/0129564 A1 | 5/2019 | Kim et al. |
| 2019/0295488 A1 | 9/2019 | Guo |
| 2021/0335301 A1 | 10/2021 | Liang et al. |

FOREIGN PATENT DOCUMENTS

| | | |
|---|---|---|
| CN | 104699368 A | 6/2015 |
| CN | 104699369 A | 6/2015 |
| CN | 107170418 A | 9/2017 |
| CN | 107643845 A | 1/2018 |
| CN | 107728367 A | 2/2018 |
| CN | 107783688 A | 3/2018 |
| CN | 109725778 A | 5/2019 |
| CN | 109979396 A | 7/2019 |
| KR | 20170100388 A | 9/2017 |

* cited by examiner

TOUCH DISPLAY DEVICE AND DRIVING METHOD FOR THE TOUCH DISPLAY DEVICE

CROSS-REFERENCE TO RELATED APPLICATIONS

The present application is the U.S. National Stage Entry of PCT/CN2021/100966, filed on Jun. 18, 2021, the entire disclosure of which is incorporated herein by reference as part of the disclosure of this application.

TECHNICAL FIELD

Embodiments of the present disclosure relate to a field of displaying technology, and particularly, relate to a touch display device and a driving method for the touch display device.

BACKGROUND

Touch screen panels Panel (TSP) is one of the simplest, most convenient and natural ways to realize human-computer interaction. With rapid development of displaying technology, touch screen panels have gradually spread throughout people's lives. At present, there are many products using touching technology, such as mobile phones, tablet computers, etc. According to different operating principles, touch screen panels can be divided into resistive touch screen panels, capacitive touch screen panels, and electromagnetic touch screen panels. According to different constituent structures, the touch screen panels can be divided into add on mode touch screen panels, on-cell touch screen panels, in-cell touch screen panels, etc. In the in-cell touch screen panels panel, touch electrodes of the touch screen panels panel are embedded inside a display panel. This can not only reduce the overall thickness of a module, but also reduce the manufacturing cost for the touch screen panels.

SUMMARY

Embodiments of the present disclosure provide a touch display device. The touch display device comprises data lines, gate lines, pixel electrodes located within display areas defined by the data lines and the gate lines, and a driving circuit. The driving circuit is configured to provide a first display data signal to the data lines during a display stage of the touch display device, and is configured to provide a second display data signal to the data lines during a predetermined period adjacent to the display stage within a touch stage of the touch display device, and provide an off-signal to the gate lines during the predetermined period such that the second display data signal is not provided to the pixel electrodes.

In an embodiment of the present disclosure, the driving circuit comprises a main controller, a timing controller, a gate driving control circuit, a source driving circuit and a gate driving circuit. The main controller is coupled to the timing controller and the gate driving control circuit, and is configured to generate a display signal and a control signal, provide the display signal to the timing controller, and provide the control signal to the gate driving control circuit. The timing controller is coupled to the gate driving control circuit and the source driving circuit, and is configured to generate the first display data signal based on the display signal and provide the first display data signal to the source driving circuit during the display stage, generate the second display data signal and provide the second display data signal to the source driving circuit during the predetermined period, and generate a start signal, a clock signal and at least one output enable signal for the gate driving circuit and provide the clock signal and the at least one output enable signal to the gate driving control circuit. The gate driving control circuit is coupled to the gate driving circuit, and is configured to receive the clock signal, the at least one output enable signal and the control signal, provide the clock signal and the at least one output enable signal to the gate driving circuit during the display stage, and provide the control signal to the gate driving circuit during the predetermined period. The source driving circuit is configured to provide the first display data signal to the data lines during the display stage, and provide the second display data signal to the data lines during the predetermined period. The gate driving circuit is configured to generate an on-signal based on the clock signal and the at least one output enable signal and provide the on-signal to the gate lines during the display stage, and generate the off-signal based on the control signal and provide the off-signal to the gate lines during the predetermined period.

In an embodiment of the present disclosure, the at least one output enable signal comprises one output enable signal, and the gate driving control circuit comprises a first selection circuit and a second selection circuit. The first selection circuit is configured to receive the clock signal and the control signal, output the clock signal during the display stage, and output the control signal during the predetermined period. The second selection circuit is configured to receive the output enable signal and the control signal, output the output enable signal during the display stage, and output the control signal during the predetermined period.

In an embodiment of the present disclosure, the first selection circuit comprises an AND gate or a multiplexer, and the second selection circuit comprises an AND gate or a multiplexer.

In an embodiment of the present disclosure, the at least one output enable signal comprises a first output enable signal and a second output enable signal, and the gate driving control circuit comprises a first selection circuit, a second selection circuit and a third selection circuit. The first selection circuit is configured to receive the clock signal and the control signal, output the clock signal during the display stage, and output the control signal during the predetermined period. The second selection circuit is configured to receive the first output enable signal and the control signal, output the first output enable signal during the display stage, and output the control signal during the predetermined period. The third selection circuit is configured to receive the second output enable signal and the control signal, output the second output enable signal during the display stage, and output the control signal during the predetermined period.

In an embodiment of the present disclosure, the first selection circuit, the second selection circuit and the third selection circuit each comprises an AND gate or a multiplexer.

In an embodiment of the present disclosure, the predetermined period is a time required for scanning N rows of pixels of the touch display device, and N is an integer greater than or equal to 4.

In an embodiment of the present disclosure, the second display data signal remains constant during the predetermined period.

In an embodiment of the present disclosure, the second display data signal during the predetermined period is the same as the first display data signal during a period for scanning one row of pixels of the touch display device which is adjacent to the predetermined period within a neighboring display stage.

In an embodiment of the present disclosure, the second display data signal during the predetermined period is the same as the first display data signal during a first period which is adjacent to the predetermined period within a neighboring display stage. The first period is equal to the predetermined period.

In an embodiment of the present disclosure, when a display refresh frequency of the touch display device is 60n Hz, N is 4n, and n is an integer greater than 0.

In an embodiment of the present disclosure, the touch display device is an in-cell touch display device.

Embodiments of the present disclosure further provide a driving method for a touch display device. The touch display device comprising: data lines, gate lines, pixel electrodes located within display areas defined by the data lines and the gate lines, and a driving circuit. the driving method comprises: during a display stage of the touch display device, the driving circuit providing a first display data signal to the data lines, and during a predetermined period adjacent to the display stage within a touch stage of the touch display device, the driving circuit providing a second display data signal to the data lines and providing an off-signal to the gate lines such that the second display data signal is not provided to the pixel electrodes.

In an embodiment of the present disclosure, the driving circuit comprises a main controller, a timing controller, a gate driving control circuit, a source driving circuit and a gate driving circuit. During the display stage and the predetermined period, the main controller provides a display signal to the timing controller and a control signal to the gate driving control circuit, the timing controller generates the first display data signal during the display stage and generates the second display data signal during the predetermined period based on the display signal, generates a start signal, a clock signal and at least one output enable signal for the gate driving circuit, and provides the clock signal and the at least one output enable signal to the gate driving control circuit. During the display stage, the driving circuit providing a first display data signal to the data lines comprises: during the display stage, the timing controller provides the first display data signal to the source driving circuit, the source driving circuit provides the first display data signal to the data lines, the gate driving control circuit provides the clock signal and the at least one output enable signal to the gate driving circuit, and the gate driving circuit generates an on-signal based on the start signal, the clock signal and the at least one output enable signal and provides the on-signal to the gate lines. During the predetermined period, the driving circuit providing a second display data signal to the data lines and providing an off-signal to the gate lines such that the second display data signal is not provided to the pixel electrodes comprises: during the predetermined period, the timing controller provides the second display data signal to the source driving circuit, the source driving circuit provides the second display data signal to the data lines, the gate driving control circuit provides the control signal to the gate driving circuit, and the gate driving circuit generates the off-signal based on the control signal and provides the off-signal to the gate lines.

In an embodiment of the present disclosure, during the display stage, the control signal is at a first level, such that the gate driving control circuit provides the clock signal and the at least one output enable signal to the gate driving circuit, and the gate driving circuit generates the on-signal based on the clock signal and the at least one output enable signal and provides the on-signal to the gate lines. During the predetermined period, the control signal is at a second level, such that the gate driving circuit generates the off-signal based on the control signal and provides the off-signal to the gate lines.

In an embodiment of the present disclosure, in the case where the gate driving control circuit comprises only a multiplexer, the control signal is at the second level during the display stage and the predetermined period.

In an embodiment of the present disclosure, the predetermined period is a time required for scanning N rows of pixels of the touch display device, and N is an integer greater than or equal to 4.

In an embodiment of the present disclosure, the second display data signal remains constant during the predetermined period.

In an embodiment of the present disclosure, the second display data signal during the predetermined period is the same as the first display data signal during a period for scanning one row of pixels of the touch display device which is adjacent to the predetermined period within a neighboring display stage.

In an embodiment of the present disclosure, the second display data signal during the predetermined period is the same as the first display data signal during a first period which is adjacent to the predetermined period within a neighboring display stage, and wherein the first period is equal to the predetermined period.

Further aspects and areas of applicability will become apparent from the description provided herein. It should be understood that various aspects of the present application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present application.

Corresponding reference numerals indicate corresponding parts or features throughout the several diagrams of the drawings.

DETAILED DESCRIPTION

Firstly, it should be noted that, as used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. The term "example" used herein, particularly when followed by a listing of terms, is merely exemplary and illustrative and should not be deemed to be exclusive or comprehensive.

Additionally, further to be noted, when the elements and the embodiments thereof of the present application are introduced, the articles "a/an", "one", "the" and "said" are intended to represent the existence of one or more elements. Unless otherwise specified, "a plurality of" means two or more. The expressions "comprise", "include", "contain" and "have" are intended as inclusive and mean that there may be other elements besides those listed. The terms such as "first" and "second" are used herein only for purposes of description and are not intended to indicate or imply relative importance and the order of formation.

Unless otherwise defined, all terms (including technical and scientific terms) used herein have the same meaning as commonly understood by one of ordinary skill in the art to which this inventive subject matter belongs. It will be further understood that terms such as those defined in commonly used dictionaries should be interpreted to have meanings consistent with their meanings in the context of the specification and related art, and will not be interpreted in an idealized or overly formalized form, unless otherwise expressly defined herein. As used herein, the statement of two or more parts being "connected" or "coupled" together shall mean that these parts are joined together directly or through one or more intervening components.

Exemplary embodiments will now be described more fully with reference to the accompanying drawings.

Figure 1:
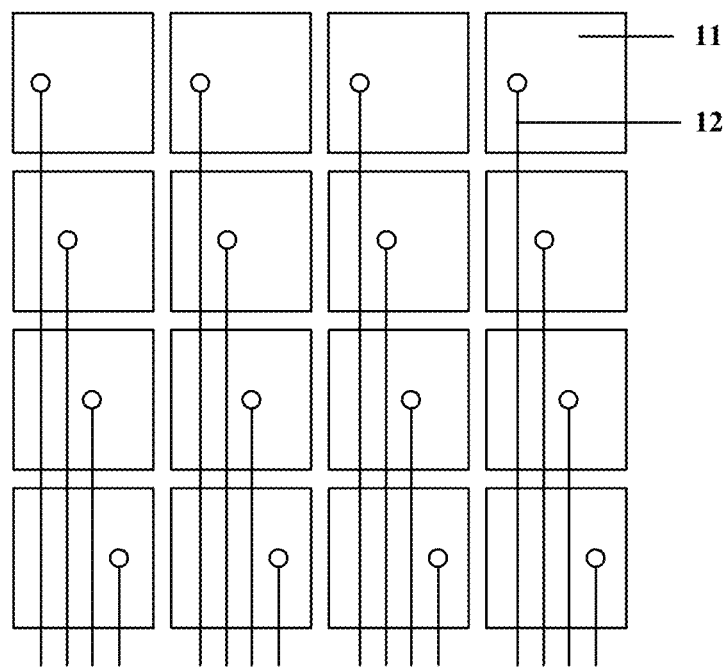
FIG. 1 shows a schematic plan view of a touch electrode pattern of an in-cell touch display device.

At present, an in-cell touch display device can adopt a liquid crystal displaying mode. The liquid crystal displaying modes capable of realizing in-cell touching function mainly include an In Plane Switching (IPS) mode and an Advanced Super Dimensional Switching (ADS) mode. FIG. 1 shows a schematic plan view of a touch electrode pattern of an in-cell touch display device. It should be noted that touch electrodes 11 and common electrodes are integrated into a same layer, such that the touching function is embedded inside the touch display panel. Referring to FIG. 1, the touch electrodes 11 are arranged in an array arrangement. Wirings 12 are connected to the touch electrodes 11 through vias (not shown), and are led across surfaces of the touch electrodes 11 to a driving IC (not shown) under the panel.

Figure 2:
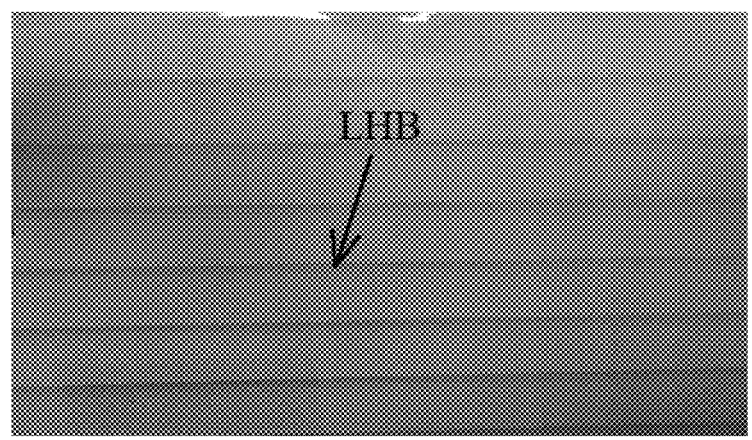
FIG. 2 is a picture showing a horizontal stripe phenomenon.

However, in a large-sized in-cell touch display device, due to problems such as large resistance and large parasitic capacitance of the wirings for touching, touching effect is not good, and it is even difficult to achieve touching. In addition, since the in-cell touch display device adopts an operation mode of displaying and touching being time division multiplexed, a displaying period is reduced by half compared with normal products (for example, products with a display refresh frequency of 60 Hz). Under the above-mentioned adverse effects, in case of the in-cell touch display device is manufactured to have an super-large size, when the display device performs displaying-to-touching or touching-to-displaying switching, display defects such as horizontal stripes may occur. The horizontal stripes are, for example, Long Horizon Blanking (LHB, i.e., long horizontal blanking area) stripes, as shown in FIG. 2. As an example, when the touch electrodes in the in-cell touch display device adopt the arrangement of FIG. 1, the LHB horizontal stripe phenomenon may occur between the touch electrodes 11.

Figure 3:
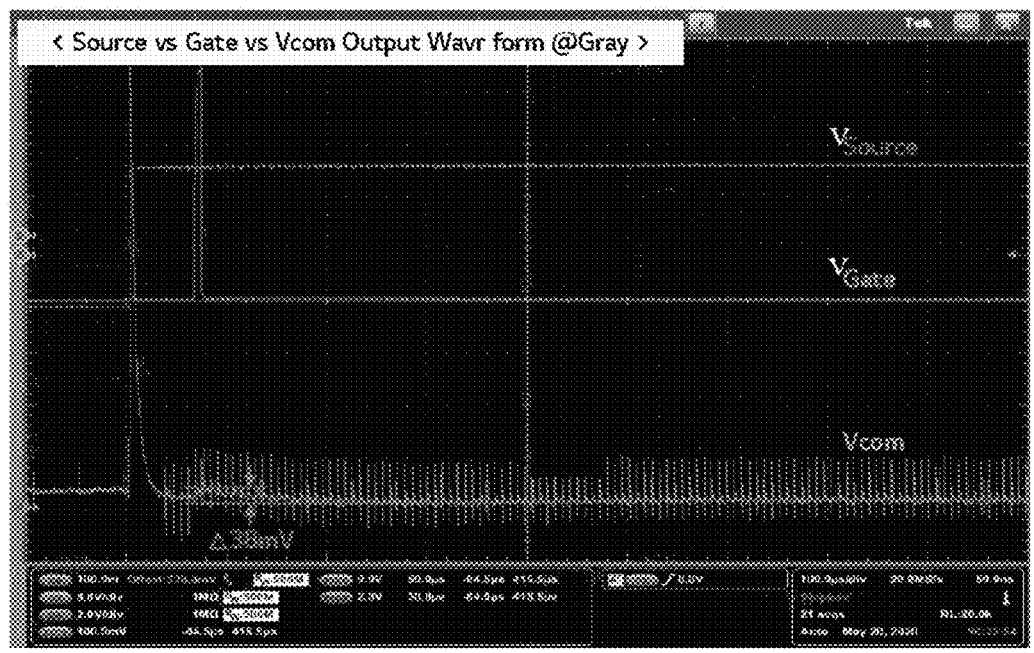
FIG. 3 shows a waveform diagram when voltage fluctuations occur.

The reason for the display defects is that when switching from a touch stage to a display stage or from the display stage to the touch stage, a driving voltage for the display device changes substantially, for example, suddenly becomes larger or smaller, resulting in severe voltage fluctuations. FIG. 3 shows a waveform diagram of the driving voltage measured when a switching between the display stage and the touch stage occurs. It should be noted that FIG. 3 is a waveform diagram improved by an embodiment of the present disclosure. As shown in FIG. 3, both VGate and Vcom have highest peak value, and VSource has a sudden rise. The highest peak value of Vcom is basically at the same time point as the sudden rise of VSource, and a fluctuation variation of Vcom is less than 38 mV when the highest peak value of VGate occurs, which will not lead to a generation of the horizontal stripes. However, before using the embodiment of the present disclosure for improvement, the highest peak value of Vcom and the highest peak value of VGate are basically at the same time point as the sudden rise of VSource, and a large variation in Vcom easily affects normal displaying of the touch display device. Thus, the large voltage fluctuation phenomenon of Vcom causes the display defects, for example, LHB stripes as shown in FIG. 2, occurred on a display screen of the touch display device.

The present disclosure provides a touch display device, which can avoid the above-mentioned driving voltage fluctuation phenomenon when the touch display device switches from the display stage to the touch stage or from the touch stage to the display stage, so as to avoid the occurrence of LHB horizontal stripes and then further improve displaying effect of the touch display device.

Figure 4:
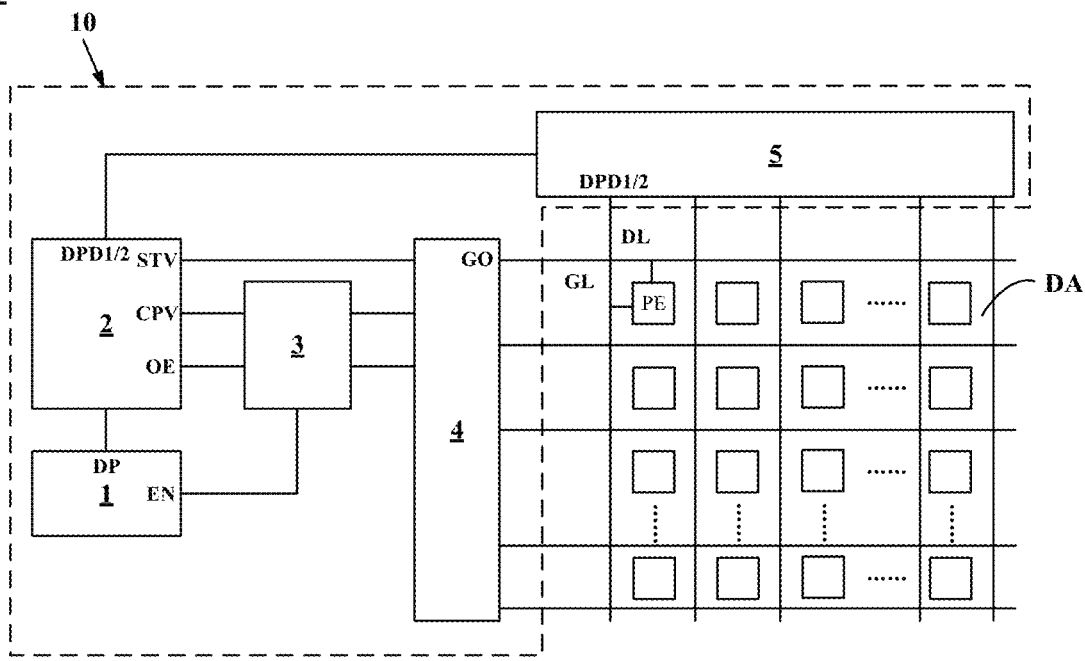
FIG. 4 shows a block diagram of a touch display device according to an embodiment of the present disclosure.

FIG. 4 shows a block diagram of a touch display device 100 according to an embodiment of the present disclosure. As shown in FIG. 4, the touch display device 100 may include data lines DL, gate lines GL, pixel electrodes PE and a driving circuit 10. The pixel electrodes PE may be located within display areas DA defined by the data lines DL and the gate lines GL, and be arranged in an array.

Referring to FIG. 4, in an embodiment of the present disclosure, the driving circuit 10 may include: a main controller 1, a timing controller 2, a gate driving control circuit 3, a gate driving circuit 4 and a source driving circuit 5.

The main controller 1 may be coupled to the timing controller 2 and the gate driving control circuit 3. The main controller 1 may be configured to generate a display signal DP and a control signal EN, provide the display signal DP to the timing controller 2 and provide the control signal EN to the gate driving control circuit 3.

The timing controller 2 may be coupled to the gate driving control circuit 3 and the source driving circuit 5. The timing controller 2 may be configured to generate a display data signal DPD based on the display signal DP, provide the display data signal DPD to the source driving circuit 5, generate a start signal STV, a clock signal CPV and at least one output enable signal OE for the gate driving circuit 4, and provide the clock signal CPV and the at least one output enable signal OE to the gate driving control circuit 3. As an example, the display data signal DPD may be a CEDS, USIT or CHPI signal. It should be understood that the start signal STV is used to cause the gate driving circuit 4 to start performing scanning during the display stage. The at least one output enable signal OE is used to enable the gate driving circuit 4 to perform scanning during the display stage.

Figure 5:
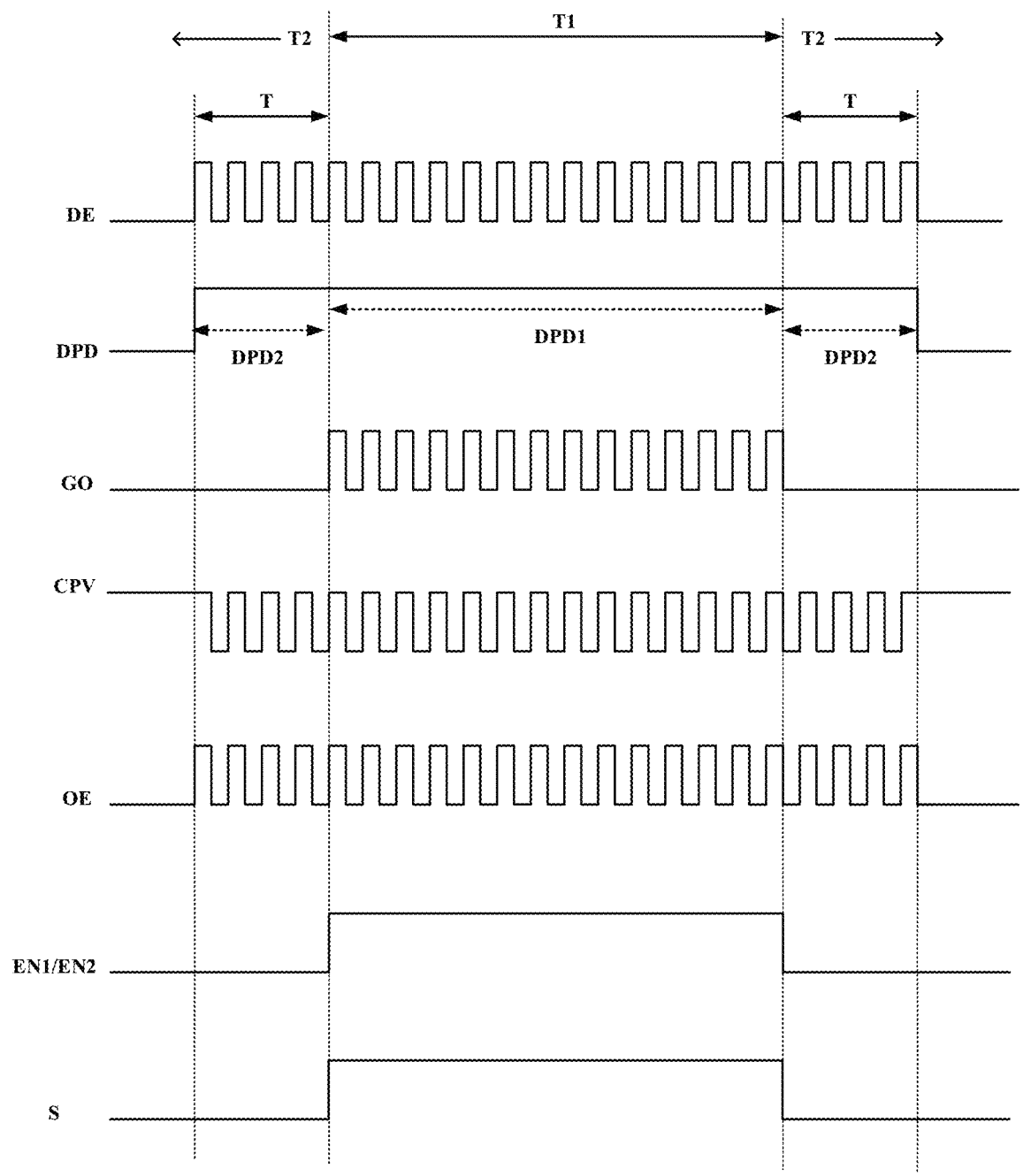
FIG. 5 shows a timing diagram of a driving circuit according to an embodiment of the present disclosure.

FIG. 5 shows a timing diagram of a driving circuit according to an embodiment of the present disclosure. In an embodiment of the present disclosure, the driving circuit 10 may be configured to provide the display data signal DPD to the data lines DL during the display stage T1 of the touch display device 100 and a predetermined period T adjacent to the display stage T1 within the touch stage T2 of the touch display device 100. The display stage T1 and the touch stage T2 are periods adjacent to each other. In an embodiment of the present disclosure, the display data signal DPD may include a first display data signal DPD1 and a second display data signal DPD2. The first display data signal DPD1 is a display data signal provided by the driving circuit 10 to the data lines DL during the display stage T1. The second display data signal DPD2 is a display data signal provided by the driving circuit 10 to the data lines DL during the predetermined period T.

It should be noted that, during the display stage T1, the display data signal DPD in the accompanying drawings may be the first display data signal DPD1; while during the predetermined period T, the display data signal DPD in the accompanying drawings may be the second display data signal DPD2. In addition, it can be understood that the first display data signal DPD1 and the second display data signal DPD2 may include the same signal, or may include different signals, which all fall within a protection scope of the present disclosure. A description thereof will be developed below.

In an embodiment of the present disclosure, the driving circuit 10 may also be configured to provide a gate control signal GO as an off-signal to the gate lines GL during the predetermined period T, such that the second display data signal DPD2 is not provided to the pixel electrodes PE.

It should be noted that, in order to completely solve the problem of possible display horizontal stripes, the above-mentioned predetermined period is set before and after individual display stages T1. Of course, if the horizontal stripes problem is not serious, the above-mentioned predetermined period may be set only before and/or after several display stages T1. For the convenience of driving, the present disclosure takes as an example that all the predetermined periods T have the same period. Of course, those skilled in the art can also adjust the specific period of the predetermined period T according to actual needs. For example, the predetermined periods T before and after the same display stage T1 have different period, all the predetermined periods T before the display stage T1 have the same period, all the predetermined periods T after the display stage T1 have the same period, or the predetermined periods T of different periods within one frame have different periods, etc. The present disclosure does not list them all here. It should be understood that the above-mentioned different examples of the predetermined period should all fall within the protection scope of the present disclosure.

More specifically, in an embodiment of the present disclosure, the first display data signal DPD1 may be provided during the display stage T1 of the touch display device 100, and the second display data signal DPD2 may be provided during the predetermined period T adjacent to the display stage T1 within the touch stage 12 of the touch display device 100. As an example, the main controller 1 may provide a data enable signal DE to the timing controller 2. Thus, based on the display signal DP and the data enable signal DE, the timing controller 2 can generate the first display data signal DPD1 and provide the first display data signal DPD1 to the source driving circuit 5 during the display stage T1, and generate the second display data signal DPD2 and provide the second display data signal DPD2 to the source driving circuit 5 during the predetermined period T. In an embodiment of the present disclosure, the data enable signal DE may be configured to enable the first display data signal DPD1 and the second display data signal DPD2 to be provided to the source driving circuit 5 during the display stage T1 and the predetermined period T, respectively, as shown in the timing of the data enable signal DE in FIG. 5.

In addition, it should be noted that the predetermined period T adjacent to the display stage T1 within the touch stage T2 may refer to a predetermined period T adjacent to the previous one display stage T1 within one touch stage T2 and/or a predetermined period T adjacent to the latter one display stage T1 with one touch stage T2. In other words, the predetermined period T may refer to a period before switching from touching to displaying and/or a period after switching from displaying to touching.

The gate driving control circuit 3 may be configured to receive the clock signal CPV, the at least one output enable signal OE and the control signal EN. In the embodiment of the present disclosure, during the display stage T1, the gate driving control circuit 3 may be configured to provide the clock signal CPV and the at least one output enable signal OE to the gate driving circuit 4. During the predetermined period T, the gate driving control circuit 3 may be configured to provide the control signal EN to the gate driving circuit 4.

The gate driving circuit 4 may be configured to, during the display stage T1, generate a gate control signal GO as an on-signal based on the clock signal CPV and the at least one output enable signal OE, and provide the on-signal to the gate lines GL, and during the predetermined period T, generate a gate control signal GO as an off-signal based on the control signal EN, and provide the off-signal to the gate lines GL.

The source driving circuit 5 may be configured to provide the display data signal DPD to the data lines DL. As an example, the source driving circuit 5 may be configured to provide the first display data signal DPD1 to the data lines DL during the display stage T1 and to provide the second display data signal DPD2 to the data lines DL during the predetermined period T. It is understood that, for example, the source driving circuit 5 may receive the display data signal as a digital signal and output the display data signal as an analog signal.

Figure 6:
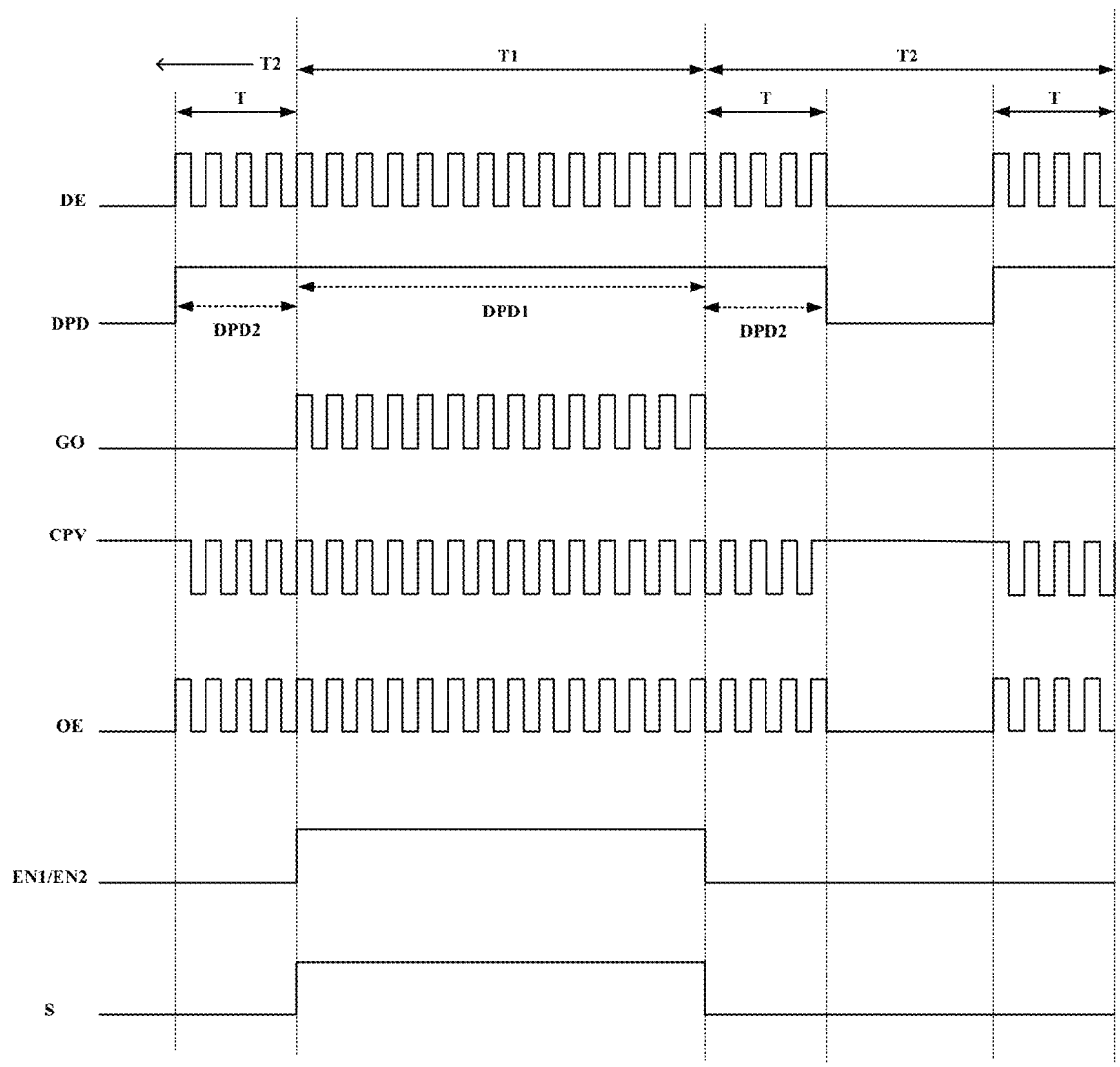
FIG. 6 shows a timing diagram of a driving circuit according to an embodiment of the present disclosure.

FIG. 6 shows a timing diagram of a driving circuit according to an embodiment of the present disclosure. Compared with FIG. 5, FIG. 6 further shows a timing diagram of signals during a complete touch stage T2. It can be understood that the touch display device 100 may be used to implement a touching function during a period other than the predetermined period T within the touch stage T2. The signals shown in FIG. 6 may be configured to, during the predetermined period T, cause the gate driving circuit 4 to provide the off-signal to the gate lines GL and cause the source driving circuit 5 not to provide the second display data signal DPD2 to the data lines DL. For other detailed description of the signals, reference may be made to the related description of FIG. 5, which will not be repeated here.

In the embodiments of the present disclosure, by setting a gate driving control circuit, the gate driving circuit provides an off-signal to gate lines during a predetermined period adjacent to a display stage within a touch stage. Meanwhile, during the predetermined period, a source driving circuit provides a display data signal to data lines. This enables the data lines to be provided with corresponding signals, e.g., driving voltages, during a predetermined period before and/or after the moment of display-touch or touch-display switching. Thus, it is avoided that the driving voltage changes substantially at the moment of display-touch or touch-display switching, for example, the driving voltage corresponding to a state of switching from touch to display suddenly increases, and/or the driving voltage corresponding to a state of switching from display to touch suddenly decreases. This can avoid LHB horizontal stripes to generate on the display screen of the touch display device, which is beneficial to improve the display effect of the touch display device.

Figure 7:
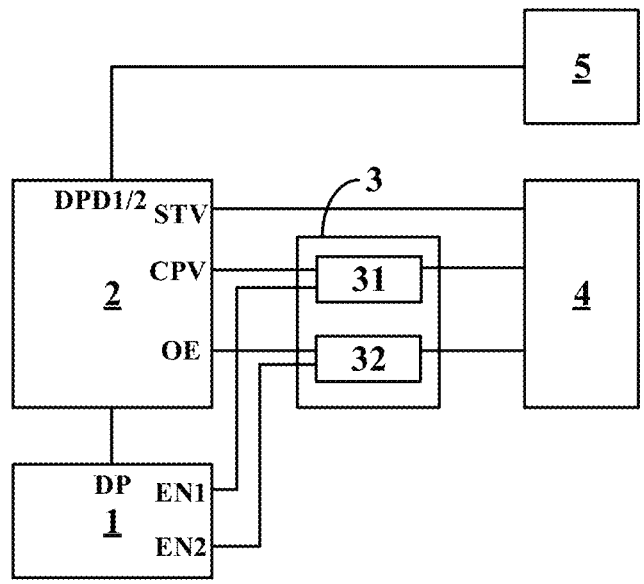
FIG. 7 shows a block diagram of a driving circuit according to an embodiment of the present disclosure.

FIG. 7 shows a block diagram of a driving circuit according to an embodiment of the present disclosure, in which the gate driving control circuit 3 includes a first selection circuit 31 and a second selection circuit 32. As shown in FIG. 7, in an embodiment of the present disclosure, the at least one output enable signal OE may include one output enable signal OE. In this case, the gate driving control circuit 3 may include the first selection circuit 31 and the second selection circuit 32. It should be noted that, in this case, the control signal EN output by the main controller 1 may include a control signal EN1 and a control signal EN2. Since the control signal EN1 and the control signal EN2 are identical, they are collectively referred to as control signals EN hereinafter.

In an embodiment of the present disclosure, the first selection circuit 31 is configured to receive the clock signal CPV and the control signal EN, output the clock signal CPV during the display stage T1 and output the control signal EN during the predetermined period T. The second selection circuit 32 is configured to receive the output enable signal OE and the control signal EN, output the output enable signal OE during the display stage T1 and output the control signal EN during the predetermined period T. It should be understood that the control signal EN may be provided to the first selection circuit 31 and the second selection circuit 32, respectively.

In an exemplary embodiment of the present disclosure, the first selection circuit 31 may include an AND gate or a multiplexer. The second selection circuit 32 may include an AND gate or a multiplexer.

The following describes an embodiment in which the first selection circuit 31 and the second selection circuit 32 each include an AND gate.

Figure 8:
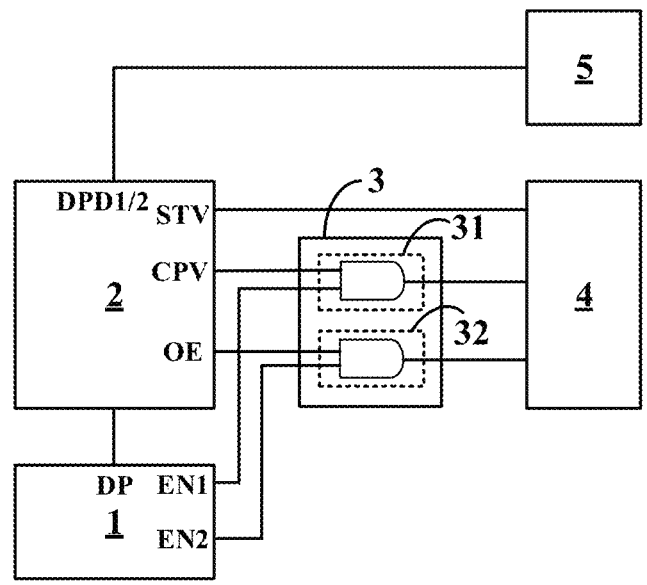
FIG. 8 shows a block diagram of a driving circuit according to an embodiment of the present disclosure.

FIG. 8 shows a block diagram of a driving circuit according to an embodiment of the present disclosure, in which the first selection circuit 31 and the second selection circuit 32 are shown to include AND gates. In the embodiment of the present disclosure, as shown in FIG. 8, a first input terminal and a second input terminal of the first AND gate 31 respectively receive the clock signal CPV and the control signal EN, and a first input terminal and a second input terminal of the second AND gate 32 respectively receive the output enable signal OE and the control signal EN.

Referring to FIGS. 5 and 8, in the embodiment of the present disclosure, the control signal EN is at a high level during the display stage T1 and is at a low level during a first period T. On one hand, during the display stage T1, for the first AND gate 31, the clock signal CPV received at its first input terminal is at a high level, and since the control signal EN received at its second input terminal is also at a high level, an output terminal of the first AND gate 31 outputs a high level. It should be understood that since the output terminal of the first AND gate 31 outputs the same level state as the clock signal CPV, in present disclosure, it can be considered that the output terminal of the first AND gate 31 outputs the clock signal CPV during the display stage T1. On the other hand, during the first period T, since the control signal EN received at the second input terminal of the first AND gate 31 is at a low level, the output terminal of the first AND gate 31 outputs a low level. It should be understood that since the output terminal of the first AND gate 31 outputs the same level state as the control signal EN, in present disclosure, it can be considered that the output terminal of the first AND gate 31 outputs the control signal EN during the first period T.

Similarly, for the second AND gate 32, on one hand, during the display stage T1, the output enable signal OE received at the first input terminal of the second AND gate 32 is at a high level, and since the control signal EN received at its second input terminal is also at a high level, an output terminal of the second AND gate 32 outputs a high level. It should be understood that since the output terminal of the second AND gate 32 outputs the same level state as the output enable signal OE, in present disclosure, it can be considered that the output terminal of the second AND gate 32 outputs the output enable signal OE during the display stage T1. On the other hand, during the first period T, since the control signal EN received at the second input terminal of the second AND gate 32 is at a low level, the output terminal of the second AND gate 32 outputs a low level. It should be understood that since the output terminal of the second AND gate 32 outputs the same level state as the control signal EN, in present disclosure, it can be considered that the output terminal of the second AND gate 32 outputs the control signal EN during the first period T.

It should be understood that, according to the above, during the display stage T1, the signal output by the gate driving control circuit 3 enables the gate driving circuit 4 to output an on-signal. During the display stage T1, since the first AND gate 31 and the second AND gate 32 output the clock signal CPV at a high level and the output enable signal OE at a high level, respectively, the gate driving circuit 4 outputs an on-signal at a high level. In this case, a switching transistor in the pixel circuit of the touch display device may be an N-type transistor. Of course, the switching transistor can also be a P-type transistor, so those skilled in the art can adjust the level state of each signal (for example, the clock signal CPV, the output enable signal OE, the control signal EN, etc.) according to actual needs when the signals are valid, which will not be described in detail here.

In the embodiment of the present disclosure, during the display stage T1, the control signal EN is at a first level V1, such that the clock signal CPV and the at least one output enable signal OE are provided to the gate driving circuit 4, thereby enabling the gate driving circuit 4 to output the on-signal. During the predetermined period T, the control signal EN is at a second level V2, such that the gate driving circuit 4 can output the off-signal.

Referring to the timing diagram shown in FIG. 5, as an example, the first level V1 may be a high level, and the second level V2 may be a low level. It should be understood that the first level V1 may also be a low level, and the second level V2 may also be a high level. Those skilled in the art can adjust the level state of the control signal EN according to the level state of the on-signal output by the gate driving circuit 4.

The following describes an embodiment in which the first selection circuit 31 and the second selection circuit 32 include a multiplexer.

It should be noted that the exemplary embodiment of the present disclosure adopts a multiplexer with two input terminals, one selection terminal and one output terminal. It can be understood that those skilled in the art can select other multiplexers with more input terminals and/or selection terminals according to actual situations (for example, involving more than two different signal inputs), which will not be repeated here.

Figure 9:
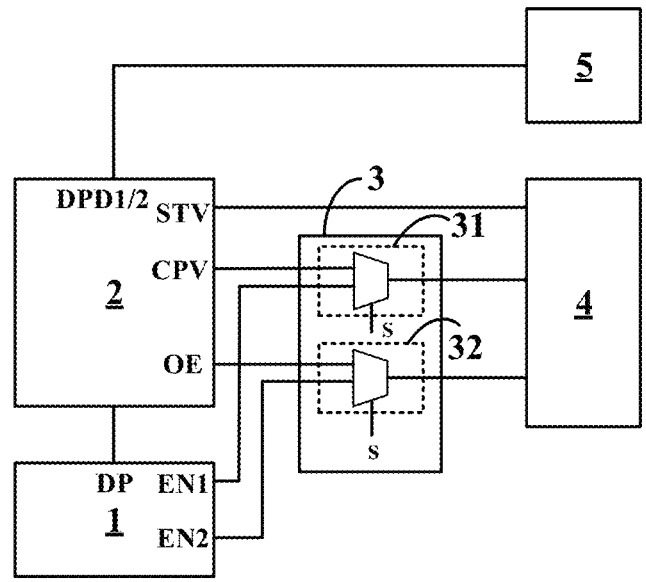
FIG. 9 shows a block diagram of a driving circuit according to an embodiment of the present disclosure.

FIG. 9 shows a block diagram of a driving circuit according to an embodiment of the present disclosure, in which the first selection circuit 31 and the second selection circuit 32 are shown to include a multiplexer.

In the embodiment of the present disclosure, as shown in FIG. 9, a first input terminal of the first multiplexer 31 receives the clock signal CPV, a second input terminal thereof receives the control signal EN, and a selection terminal thereof receives a selection signal S. A first input terminal of the second multiplexer 32 receives the output enable signal OE, a second input terminal thereof receives the control signal EN, and a selection terminal thereof receives the selection signal S. It should be noted that those skilled in the art can input the selection signal S to the selection terminals of the first and second multiplexers 31 and 32 according to design requirements. The selection signal S may come from the timing controller 2, or from other modules of the touch display device, for example, a microcontroller unit.

In an embodiment of the present disclosure, the selection signal S may be configured such that, during the display stage T1, signals from the first input terminals of the first multiplexer 31 and the second multiplexer 32 are selected to be output from the output terminal, such that the gate driving circuit 4 can output the on-signal, and during the first period T, signals from the second input terminals of the first multiplexer 31 and the second multiplexer 32 are selected to be output from the output terminal, such that the gate driving circuit 4 can output the off-signal.

A operation process of the first and second multiplexers 31, 32 is described below.

Referring to FIGS. 5 and 9, in the embodiment of the present disclosure, the selection signal S is at a high level during the display stage T1 and is at a low level during the first period T. In an exemplary embodiment of the present disclosure, the first and second multiplexers 31, 32 are configured to, from the output terminal, output the input signal from the first input terminal when the selection signal S is at a high level, and from the output terminal, output the input signal from the second input terminal when the selection signal S is at a low level.

In an exemplary embodiment of the present disclosure, during the display stage T1, the selection signal S is at a high level, and at this time, the output terminal of the first multiplexer 31 outputs the input signal, i.e., the clock signal CPV, from the first input terminal, and the output terminal of the second multiplexer 32 outputs the input signal, i.e., the output enable signal OE, from the first input terminal. Thereby, the clock signal CPV and the output enable signal OE can be provided to the gate driving circuit 4, such that the gate driving circuit 4 can output the on-signal. During the first period T, the selection signal S is at a low level, and at this time, the output terminals of the first multiplexer 31 and the second multiplexer 32 both output the input signal, i.e., the control signal EN, from the second input terminal. During the first period T, the control signal EN is at a low level, thereby enabling the gate driving circuit 4 to output the off-signal.

As previously described with reference to FIG. 8, in the embodiment of the present disclosure, during the display stage T1, the control signal EN is at the first level V1, such that the clock signal CPV and the at least one output enable signal OE are provided to the gate driving circuit 4, such that the gate driving circuit 4 can output the on-signal. During the predetermined period T, the control signal EN is at the second level V2 and is provided to the gate driving circuit 4, such that the gate driving circuit 4 can output the off-signal. For example, referring to the timing diagram of FIG. 5, the first level V1 may be a high level, and the second level V2 may be a low level.

Alternatively, in an exemplary embodiment of the present disclosure, when both the first selection circuit 31 and the second selection circuit 32 include a multiplexer, the control signal EN is provided to the gate driving circuit 4 only during the first period T. Therefore, the control signal EN may be configured to be at a constant level, e.g., at the second level, during the display stage T1 and the first period T. As an example, the second level may be a low level.

Figure 10:
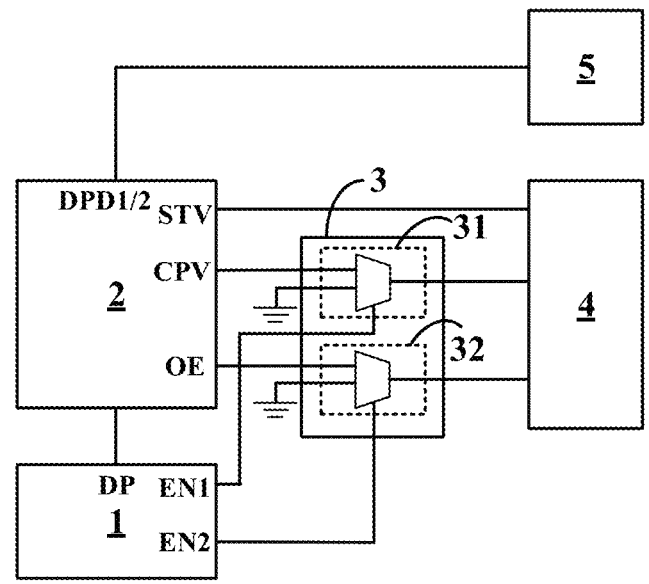
FIG. 10 shows a block diagram of a driving circuit according to an embodiment of the present disclosure.

As an alternative embodiment, FIG. 10 shows a block diagram of a driving control circuit according to an embodiment of the present disclosure. The structure of FIG. 10 is similar to that of FIG. 9, except that the second input terminals of the first multiplexer 31 and the second multiplexer 32 in FIG. 10 are both grounded, and the selection terminals both receive the control signal EN.

It should be noted that, in the above example, the second input terminals of the first multiplexer 31 and the second multiplexer 32 are both grounded for example only, which should not be regarded as a limit to the present disclosure. In the embodiment of the present disclosure, other level signals can also be input to the second input terminals of the first multiplexer 31 and the second multiplexer 32, as long as the gate driving circuit 4 can output the off-signal when signals from the first multiplexer 31 and the second multiplexer 32 are selected to be output from the output terminals. Those skilled in the art can adjust the level signals input at the second input terminals of the first multiplexer 31 and the second multiplexer 32 according to the type of driving transistors used by the pixel circuit in the touch display device. For example, when the driving transistor is an N-type transistor, the second input terminals of the first and second multiplexers 31 and 32 can input a low level signal; and when the driving transistor is a P-type transistor, the second input terminals of the first and second multiplexers 31 and 32 can input a high level signal.

A operation process of the first and second multiplexers 31 and 32 will be described below by taking the second input terminals of the first and second multiplexers 31 and 32 being grounded as an example.

Referring to FIGS. 5 and 10, in an embodiment of the present disclosure, the control signal EN is at a high level during the display stage T1 and is at a low level during the first period T. In an exemplary embodiment of the present disclosure, the first and second multiplexers 31, 32 are configured to, from the output terminal, output an input signal from the first input terminal when a high level is input to the selection terminal, and from the output terminal, output an input signal from the second input terminal when a low level is input to the selection terminal.

In an exemplary embodiment of the present disclosure, during the display stage T1, the control signal EN is at a high level, and at this time, the output terminal of the first multiplexer 31 outputs the input signal, i.e., the clock signal CPV, from the first input terminal, and the output terminal of the second multiplexer 32 outputs the input signal, i.e., the output enable signal OE, from the first input terminal. Thus, the clock signal CPV and the output enable signal OE can be provided to the gate driving circuit 4 such that the gate driving circuit 4 can output the on-signal. During the first period T, the control signal EN is at a low level, and at this time, the output terminals of the first multiplexer 31 and the second multiplexer 32 both output the input signal, i.e., a ground signal, from the second input terminal, which is then provided to the gate driving circuit 4 such that the gate driving circuit 4 can output the off-signal.

As another example, in an embodiment of the present disclosure, one of the first selection circuit 31 and the second selection circuit 32 may include an AND gate, and the other may include a multiplexer as described above.

Figure 11:
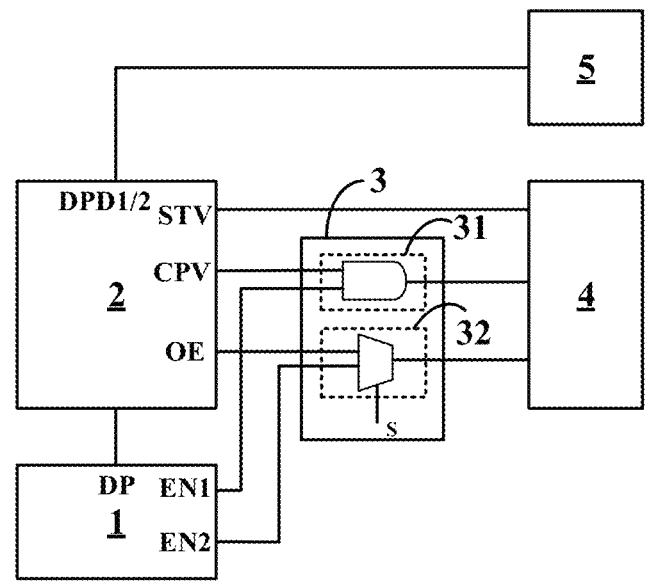
FIG. 11 shows a block diagram of a driving circuit according to an embodiment of the present disclosure.

In one aspect, as shown in FIG. 11, the first selection circuit 31 may include an AND gate and the second selection circuit 32 may include a multiplexer.

The embodiment in which the first selection circuit 31 includes an AND gate is the same as that of the first AND gate 31 in FIG. 8, and details are not repeated here.

The embodiment in which the second selection circuit 32 includes a multiplexer is the same as that of the second multiplexer 32 in FIGS. 9 and 10, and details are not repeated here.

Figure 12:
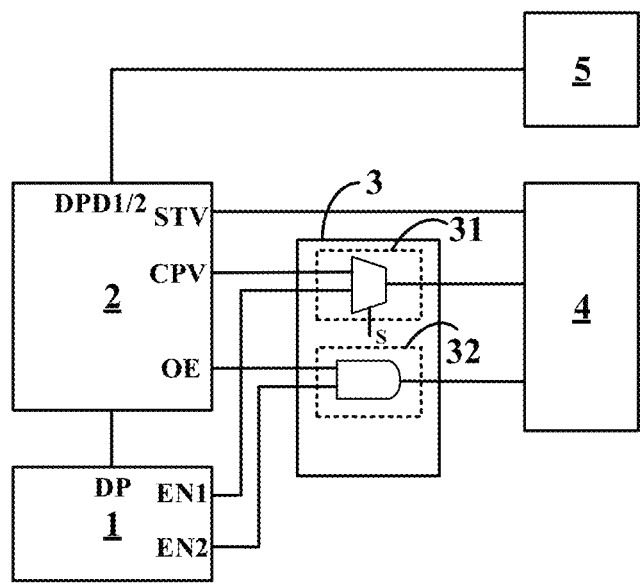
FIG. 12 shows a block diagram of a driving circuit according to an embodiment of the present disclosure.

In another aspect, as shown in FIG. 12, the first selection circuit 31 may include a multiplexer and the second selection circuit 32 may include an AND gate.

The embodiment in which the first selection circuit 31 includes a multiplexer is the same as that of the first multiplexer 31 in FIGS. 9 and 10, and details are not repeated here.

The embodiment in which the second selection circuit 32 includes an AND gate is the same as that of the second AND gate 32 in FIG. 8, and details are not repeated here.

Figure 13:
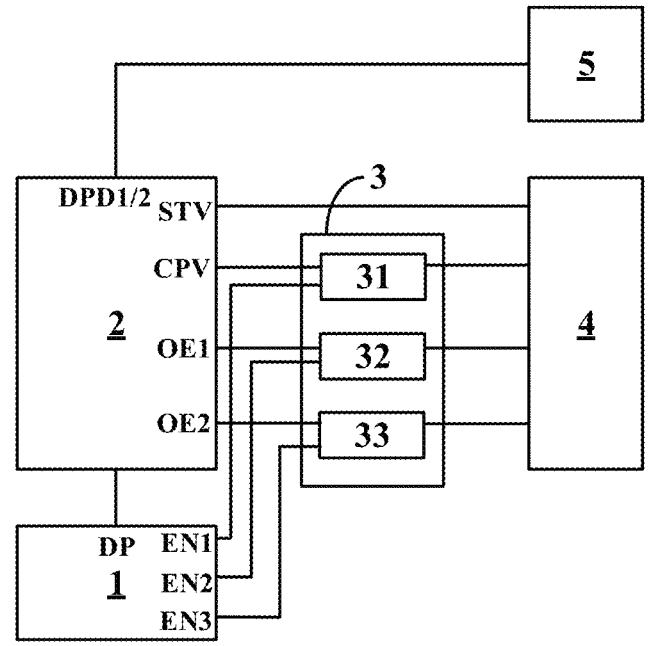
FIG. 13 shows a block diagram of a driving circuit according to an embodiment of the present disclosure.

FIG. 13 shows a block diagram of a driving circuit according to an embodiment of the present disclosure, in which the gate driving control circuit 3 includes first, second and third selection circuits 31, 32 and 33. In an embodiment of the present disclosure, the at least one output enable signal OE may include a first output enable signal OE1 and a second output enable signal OE2. In this case, the gate driving control circuit 3 may include a first selection circuit 31, a second selection circuit 32 and a third selection circuit 33. In the embodiment of the present disclosure, the first output enable signal OE1 is configured to control the gate driving circuit 3 to provide an on-signal to the gate lines GL for the pixels in odd rows; the first output enable signal OE1 is configured to control the gate driving circuit 3 to provide an on-signal to the gate lines GL for the pixels in even rows. It should be noted that, in this case, the control signal EN output by the main controller 1 may include a control signal EN1, a control signal EN2 and a control signal EN3. Since the control signals EN1, EN2 and EN3 are identical, they are collectively referred to as the control signal EN hereinafter.

Referring to FIG. 13, in an embodiment of the present disclosure, the first selection circuit 31 may be configured to receive the clock signal CPV and the control signal EN, output the clock signal CPV during the display stage T1, and output the control signal EN during the predetermined period T. The second selection circuit 32 may be configured to receive the first output enable signal OE1 and the control signal EN, output the first output enable signal OE1 during the display stage T1, and output the control signal EN during the predetermined period T. The third selection circuit 33 may be configured to receive the second output enable signal OE2 and the control signal EN, output the second output enable signal OE2 during the display stage T1, and output the control signal EN during the predetermined period T. It should be understood that the outputted control signal EN may be provided to the first selection circuit 31, the second selection circuit 32 and the third selection circuit 33, respectively.

In an exemplary embodiment of the present disclosure, the first selection circuit 31, the second selection circuit 32 and the third selection circuit 33 may each include an AND gate or a multiplexer.

The following describes an embodiment in which the first selection circuit 31, the second selection circuit 32 and the third selection circuit 33 each includes an AND gate.

Figure 14:
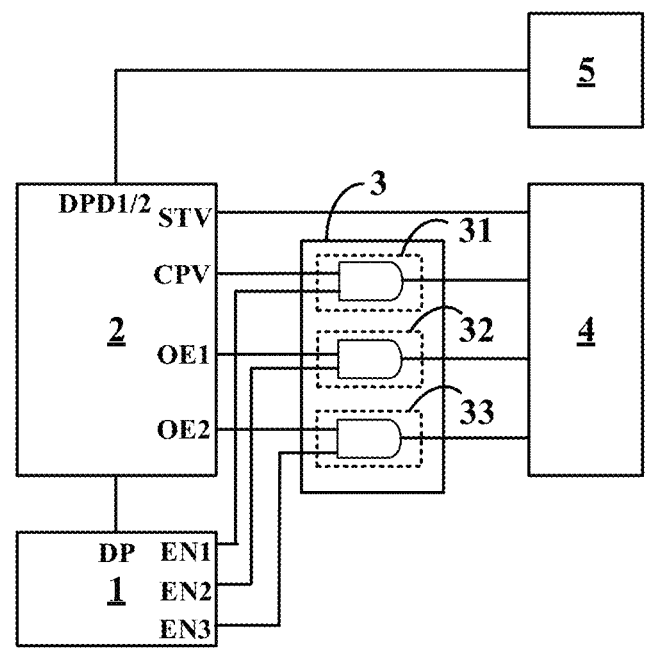
FIG. 14 shows a block diagram of a driving circuit according to an embodiment of the present disclosure.

FIG. 14 shows a block diagram of a driving circuit according to an embodiment of the present disclosure, in which the first, second and third selection circuits 31, 32 and 33 are shown as each including an AND gate. In the embodiment of the present disclosure, as shown in FIG. 14, the first input terminal and the second input terminal of the first AND gate 31, respectively, receive the clock signal CPV and the control signal EN, the first input terminal and the second input terminal of the second AND gate 32, respectively, receive the first output enable signal OE1 and the control signal EN, and the first input terminal and the second input terminal of the third AND gate 33, respectively, receive the second output enable signal OE2 and the control signal EN.

Figure 15:
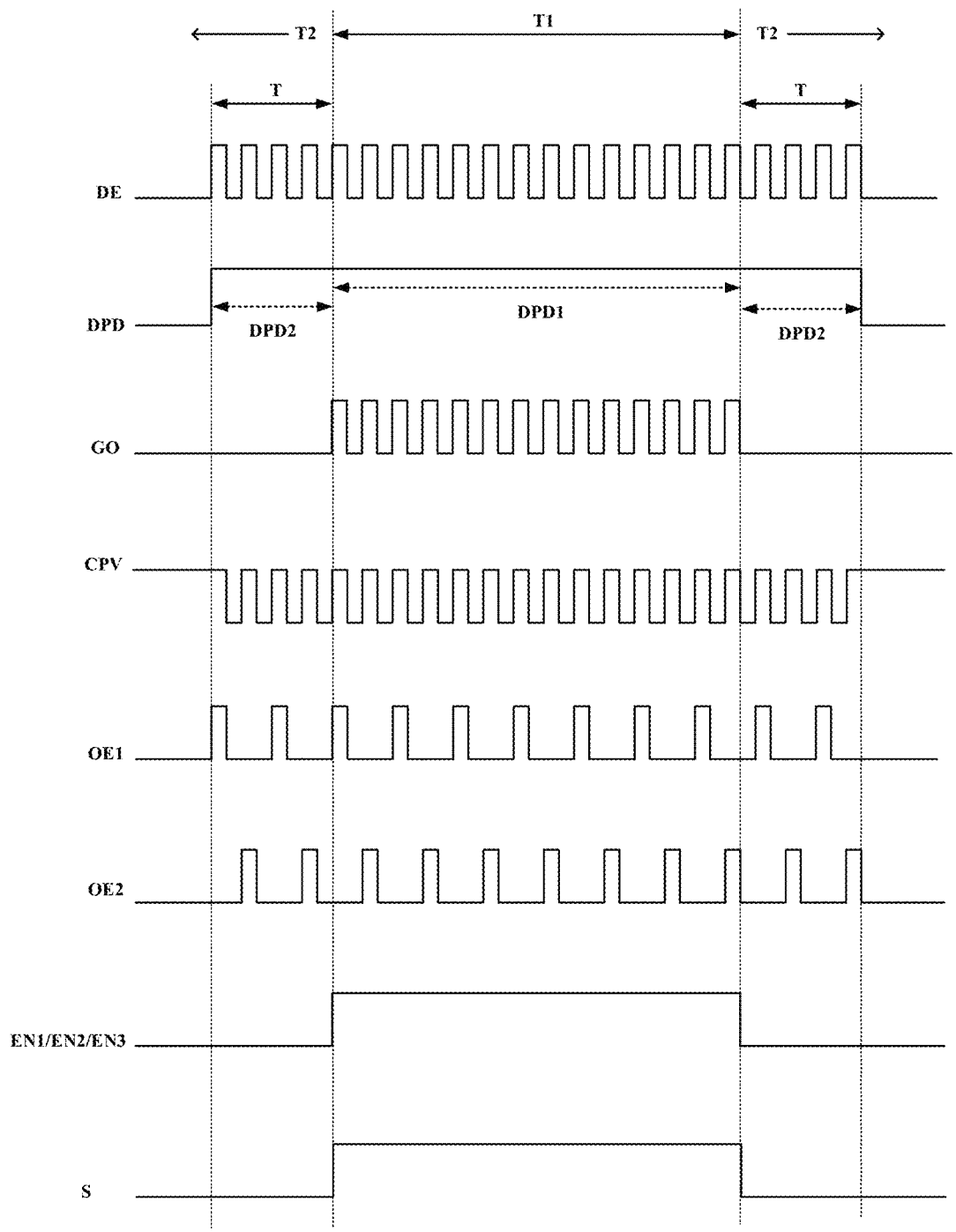
FIG. 15 shows a timing diagram of a driving circuit according to an embodiment of the present disclosure.

FIG. 15 shows a timing diagram of a driving circuit according to an embodiment of the present disclosure. Referring to FIGS. 14 and 15, in the embodiment of the present disclosure, the control signal EN is at a high level during the display stage T1 and is at a low level during the first period T. On one hand, during the display stage T1, for the first AND gate 31, the clock signal CPV received at its first input terminal is at a high level, and since the control signal EN received at its second input terminal is also at a high level, the output terminal of the first AND gate 31 outputs a high level. It should be understood that since the output terminal of the first AND gate 31 outputs the same level state as the clock signal CPV, in present disclosure, it can be considered that the output terminal of the first AND gate 31 outputs the clock signal CPV during the display stage T1. On the other hand, during the first period T, since the control signal EN received at the second input terminal of the first AND gate 31 is at a low level, the output terminal of the first AND gate 31 outputs a low level. It should be understood that since the output terminal of the first AND gate 31 outputs the same level state as the control signal EN, in present disclosure, it can be considered that the output terminal of the first AND gate 31 outputs the control signal EN during the first period T.

Similarly, for the second AND gate 32, on one hand, during the display stage T1, the first output enable signal OE1 received at the first input terminal of the second AND gate 32 is at a high level, and since the control signal EN received at its second input terminal is also at a high level, the output terminal of the second AND gate 32 outputs a high level. It should be understood that since the output terminal of the second AND gate 32 outputs the same level state as the first output enable signal OE1, in present disclosure, it can be considered that the output terminal of the second AND gate 32 outputs the first output enable signal OE1 during the display stage T1. It should be noted here that the first output enable signal OE1 enables the gate driving circuit 4 to provide an on-signal to the gate lines GL for the pixels in odd rows. On the other hand, during the first period T, since the control signal EN received at the second input terminal of the second AND gate 32 is at a low level, the output terminal of the second AND gate 32 outputs a low level. It should be understood that since the output terminal of the second AND gate 32 outputs the same level state as the control signal EN, in present disclosure, it can be considered that the output terminal of the second AND gate 32 outputs the control signal EN during the first period T.

Similarly, for the third AND gate 33, on one hand, during the display stage T1, the second output enable signal OE2 received at the first input terminal of the third AND gate 33 is at a high level, and since the control signal EN received at its second input terminal is also at a high level, the output terminal of the third AND gate 33 outputs a high level. It should be understood that since the output terminal of the third AND gate 33 outputs the same level state as the second output enable signal OE2, in present disclosure, it can be considered that the output terminal of the third AND gate 33 outputs the second output enable signal OE2 during the display stage T1. It should be noted here that the second output enable signal OE2 enables the gate driving circuit 4 to provide an on-signal to the gate lines GL for the pixels in even rows. On the other hand, during the first period T, since the control signal EN received at the second input terminal of the third AND gate 33 is at a low level, the output terminal of the third AND gate 33 outputs a low level. It should be understood that since the output terminal of the third AND gate 33 outputs the same level state as the control signal EN, in present disclosure, it can be considered that the output terminal of the third AND gate 33 outputs the control signal EN during the first period T.

It should be understood that, similar to the embodiment described above with reference to FIG. 8, during the display stage T1, the signal output by the gate driving control circuit 3 enables the gate driving circuit 4 to output an on-signal. During the display stage T1, since the first AND gate 31, the second AND gate 32, and the third AND gate 33 output the clock signal CPV at a high level, the first output enable signal OE1 at a high level, and the second output enable signal OE2 at a high level, respectively, the gate driving circuit 4 can output an on-signal. Therefore, in this case, the switching transistors in the pixel circuit in the touch display device may include N-type transistors. Of course, the switching transistor may also include a P-type transistor, such that those skilled in the art can adjust the level state of each signal (for example, the clock signal CPV, the first output enable signal OE1, the second output enable signal OE2 and the control signal EN, etc.) according to actual needs when the signals are valid. The present disclosure will not give a further description herein.

The following describes an embodiment in which the first selection circuit 31, the second selection circuit 32, and the third selection circuit 33 all include a multiplexer.

It should be noted that, similar to the foregoing, an exemplary embodiment of the present disclosure adopts a multiplexer having two input terminals, one selection terminal and one output terminal.

Figure 16:
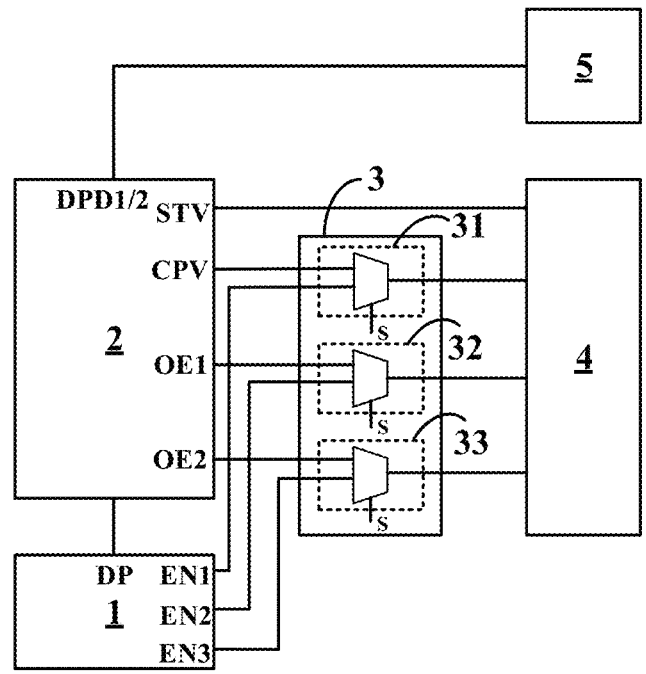
FIG. 16 shows a block diagram of a driving circuit according to an embodiment of the present disclosure.

FIG. 16 shows a block diagram of a driving control circuit according to an embodiment of the present disclosure, in which the first, second and third selection circuits 31, 32 and 33 are shown to include a multiplexer.

In the embodiment of the present disclosure, as shown in FIG. 16, a first input terminal of the first multiplexer 31 receives the clock signal CPV, a second input terminal thereof receives the control signal EN, and a selection terminal thereof receives the selection signal S. A first input terminal of the second multiplexer 32 receives the first output enable signal OE1, a second input terminal thereof receives the control signal EN, and a selection terminal thereof receives the selection signal S. A first input terminal of the third multiplexer 33 receives the second output enable signal OE2, a second input terminal thereof receives the control signal EN, and a selection terminal thereof receives the selection signal S. It should be noted that those skilled in the art can input the selection signal S to the selection terminals of the first, second and third multiplexers 31, 32 and 33 according to design requirements. The selection signal S may come from the timing controller 2, or from other modules of the touch display device, for example, a microcontroller unit.

In an embodiment of the present disclosure, the selection signal S may be configured such that, during the display stage T1, signals from the first input terminals of the first multiplexer 31, the second multiplexer 32 and the third multiplexer 33 are selected to be output from the output terminal such that the gate driving circuit can output the on-signal, and during the first period T, signals of the second input terminals of the first multiplexer 31, the second multiplexer 32 and the third multiplexer 33 are selected to be output from the output terminal such that the gate driving circuit can output the off-signal.

A operation process of the first, second and third multiplexers 31, 32, 33 is described below.

Referring to FIGS. 15 and 16, in the embodiment of the present disclosure, the selection signal S is at a high level during the display stage T1 and is at a low level during the first period T. In an exemplary embodiment of the present disclosure, the first, second and third multiplexers 31, 32, 33 are configured to, from the output terminal, output the input signal from the first input terminal when the selection signal S is at a high level, and from the output terminal, output the input signal from the second input terminal when the selection signal S is at a low level.

In an exemplary embodiment of the present disclosure, during the display stage T1, the selection signal S is at a high level, and at this time, the output terminal of the first multiplexer 31 outputs the input signal, i.e. the clock signal CPV, from the first input terminal, the output terminal of the second multiplexer 32 outputs the input signal, i.e., the first output enable signal OE1, from the first input terminal, and the output terminal of the third multiplexer 33 outputs the input signal, i.e., the second output enable signal OE2, from the first input terminal. Thereby, the clock signal CPV, the first output enable signal OE1 and the second output enable signal OE2 can be provided to the gate driving circuit 4, such that the gate driving circuit 4 can output the on-signal. During the first period T, the selection signal S is at a low level, and at this time, the output terminals of the first multiplexer 31, the second multiplexer 32 and the third multiplexer 33 all output the input signal, i.e., the control signal EN, from the second input terminal. During the first period T, the control signal EN is at a low level and is provided to the gate driving circuit 4, such that the gate driving circuit 4 can output the off-signal.

Furthermore, similar to the embodiment described above with respect to FIG. 9, in an exemplary embodiment of the present disclosure, when the first selection circuit 31, the second selection circuit 32, and the third selection circuit 33 all include a multiplexer, the control signal EN is provided to the gate driving circuit 4 only during the first period T. Thus, the control signal EN may be configured to be at a constant level, e.g. at the second level, during the display stage T1 and the first period T. As an example, the second level may be a low level.

Figure 17:
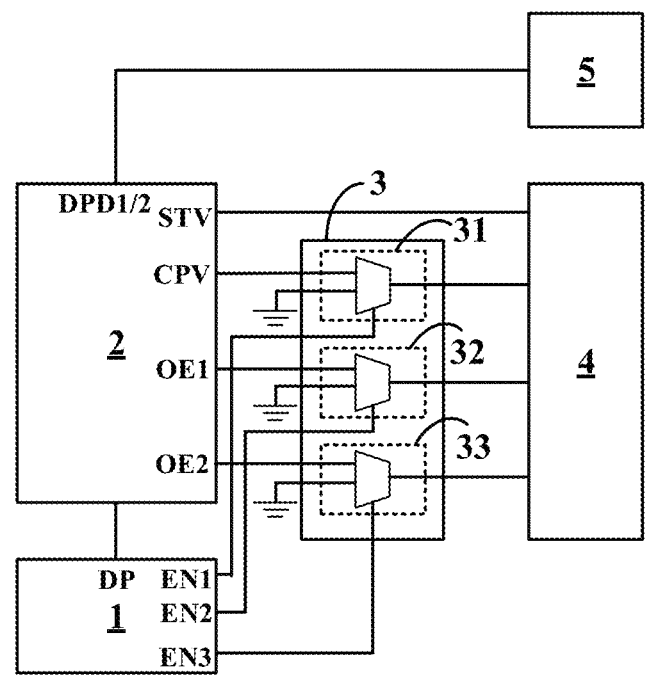
FIG. 17 shows a block diagram of a driving circuit according to an embodiment of the present disclosure.

As an alternative embodiment, FIG. 17 shows a block diagram of a driving control circuit according to an embodiment of the present disclosure. The structure of FIG. 17 is similar to that of FIG. 16, except that the second input terminals of the first multiplexer 31, the second multiplexer 32 and the third multiplexer 33 in FIG. 17 are all grounded, and the selection terminals all receive the control signal EN.

It should be noted that, similar to the embodiment described above with reference to FIG. 10, the second input terminals of the first multiplexer 31, the second multiplexer 32 and the third multiplexer 33 are all grounded for example only, which should not be regarded as a limit to the present disclosure. For other descriptions, reference may be made to the embodiment described above with respect to FIG. 10, which will not be repeated here.

A operation process of the first, second and third multiplexers 31, 32 and 33 will be described below by taking the second input terminals of the first, second and third multiplexers 31, 32 and 33 grounded as an example.

Referring to FIGS. 15 and 17, in an embodiment of the present disclosure, the control signal EN is at a high level during the display stage T1 and is at a low level during the first period T. In an exemplary embodiment of the present disclosure, the first, second and third multiplexers 31, 32 and 33 are configured to, from the output terminal, output an input signal from the first input terminal when a high level is input to the selection terminal, and from the output terminal, output an input signal from the second input terminal when a low level is input to the selection terminal.

In an exemplary embodiment of the present disclosure, during the display stage T1, the control signal EN is at a high level, and at this time, the output terminal of the first multiplexer 31 outputs the input signal, i.e., the clock signal CPV, from the first input terminal, the output terminal of the second multiplexer 32 outputs the input signal, i.e., the first output enable signal OE1, from the first input terminal, and the output terminal of the third multiplexer 33 outputs the input signal, i.e., the second output enable signal OE2, from the first input terminal. Thus, the clock signal CPV, the first output enable signal OE1 and the second output enable signal OE2 can be provided to the gate driving circuit 4 such that the gate driving circuit 4 can output the on-signal. During the first period T, the control signal EN is at a low level, and at this time, the output terminals of the first multiplexer 31, the second multiplexer 32 and the third multiplexer 33 all output the input signal, i.e., a ground signal, from the second input terminal, which is then provided to the gate driving circuit 4 such that the gate driving circuit 4 can output the off-signal.

As an alternative embodiment, the first selection circuit 3, the second selection circuit 32 and the third selection circuit 33 may respectively comprise different structures, such as an AND gate or a multiplexer, such that various different embodiments can be obtained. Regarding descriptions of processing procedures performed by the AND gates or multiplexers in various different embodiments with respect to the various signals described above (e.g., the clock signal CPV, the first output enable signal OE1, the second output enable signal OE2, and the control signal EN), reference may be made to the embodiments described with respect to FIGS. 13-17, and details are not repeated here.

In an exemplary embodiment of the present disclosure, the predetermined period T may be a time required for scanning N rows of pixels of the touch display device 100. N is an integer greater than or equal to 4.

In an embodiment of the present disclosure, when the display refresh frequency of the touch display device 100 is 60n Hz, N may be 4n, and n is an integer greater than 0.

As an example, when the display refresh frequency of the touch display device 100 is 60 Hz, N may be 4. As another example, when the display refresh frequency of the touch display device 100 is 120 Hz, N may be 8. As yet another example, when the display refresh frequency of the touch display device 100 is 180 Hz, N may be 12. As yet another example, when the display refresh frequency of the touch display device 100 is 240 Hz, N may be 16.

In an exemplary alternative embodiment of the present disclosure, a period for the display stage T1 may include a time required for scanning at least 135 rows of pixels of the touch display device 100. As an example, when the period for the display stage T1 may include the time required for scanning 135 rows of pixels of the touch display device 100, the predetermined period T may be a time required for scanning 4 rows of pixels of the touch display device 100. As another example, the period for the display stage T1 may include a time required for scanning 180 rows of pixels of the touch display device 100, and the predetermined period T may be a time required for scanning 4 rows of pixels of the touch display device 100.

In an embodiment of the present disclosure, the second display data signal DPD2 may remain constant during the predetermined period T.

In an embodiment of the present disclosure, the first display data signal DPD1 may remain constant or change during the display stage T1, and those skilled in the art may design according to specific requirements, which are not specifically limited in the present disclosure.

In an exemplary embodiment of the present disclosure, the second display data signal DPD2 during the predetermined period T may be the same as the first display data signal DPD1 during a period for scanning one row of pixels of the touch display device 100 which is adjacent to the predetermined period T within a neighboring display stage T1. It can be understood that the second display data signal DPD2 during the predetermined period T may also be the same as the first display data signal DPD1 during a period for scanning any one row of pixels which is within a neighboring display stage T1.

As an example, when a period for the display stage T1 may include a time required for scanning 135 rows of pixels of the touch display device 100, the second display data signal DPD2 during the predetermined period T may be the same as the first display data signal DPD1 provided during a period for scanning the 1st row or the 135th row of pixels within a neighboring display stage T1.

As another example, when a period for the display stage T1 may include a time required for scanning 180 rows of pixels of the touch display device 100, the second display data signal DPD2 during the predetermined period T may be the same as the first display data signal DPD1 provided during a period for scanning the 1st row or the 180th row of pixels within a neighboring display stage T1.

In an alternative embodiment of the present disclosure, the second display data signal during the predetermined period is the same as the first display data signal during a first period which is adjacent to the predetermined period within a neighboring display stage. The first period is equal to the predetermined period.

More specifically, in an exemplary embodiment of the present disclosure, the second display data signals DPD2 for N rows of pixels sequentially provided during the predetermined period T are, respectively, the same as the first display data signals DPD1 for N rows of pixels sequentially provided within the first period which is adjacent to the predetermined period T within the neighboring display stage T1. The first period is equal to the predetermined period T.

As described above, while a period for the display stage T1 may include a time required for scanning 135 rows of pixels of the touch display device 100, the predetermined period T may be a time required for scanning 4 rows of pixels of the touch display device 100. In this case, the first period may also be the time required for scanning 4 rows of pixels of the touch display device 100.

Based on the above, as an example, the second display data signals DPD2 for 4 rows of pixels sequentially provided during the predetermined period T may be, respectively, the same as the first display data signals DPD1 sequentially provided during a period within the neighboring display stage T1 for scanning the 1st row, the 2nd row, the 3rd row and 4th row of pixels. As another example, the second display data signals DPD2 for 4 rows of pixels sequentially provided during the predetermined period T may be, respectively, the same as the first display data signals DPD1 sequentially provided during a period within the neighboring display stage T1 for scanning the 132th row, the 133th row, the 134th row and 135th row of pixels.

When a period for the display stage T1 may include a time required for scanning 180 rows of pixels of the touch display device 100, the second display data signal DPD2 during the predetermined period T may be configured in a similar manner to the 135 row embodiment, which will not be repeated here. In addition, it should be understood that a period for the touch stage T2 is not specifically limited in the present disclosure, and those skilled in the art can limit it according to actual touch requirements. Optionally, the period for the touch stage T2 may be the same as the period for the display stage T1. As an example, the period for the touch stage 12 may include a time required for scanning at least 135 rows of pixels of the touch display device 100. As an example, the period for the touch stage 12 may include a time required for scanning 135 rows of pixels of the touch display device 100.

Figure 18:
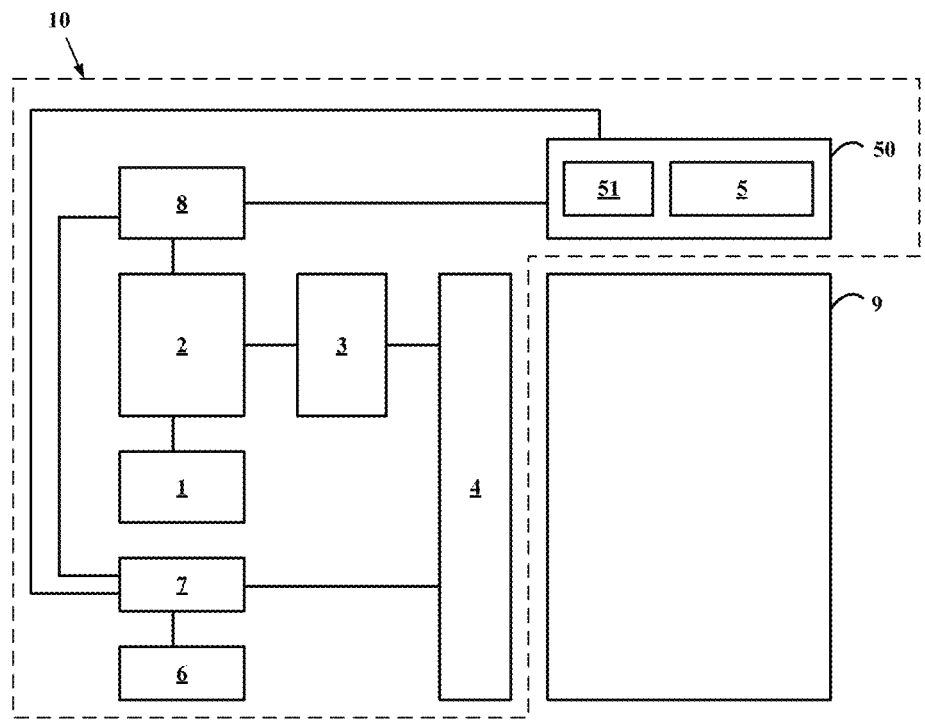
FIG. 18 shows a block diagram of a touch display device according to an embodiment of the present disclosure.

FIG. 18 shows a block diagram of a touch display device 100 according to an embodiment of the present disclosure. Referring to FIG. 18, the touch display device 100 may further include a touch display panel 9. In the embodiment of the present disclosure, the touch display panel 9 includes pixel electrodes PE as shown in FIG. 4. It can be understood that the touch display panel 9 may include other structures, such as an array substrate, a color filter substrate, or a liquid crystal. Those skilled in the art can make relevant designs according to requirements, which are not specifically limited herein. As an example, the gate driving circuit may be formed in the touch display panel 9.

In an embodiment of the present disclosure, the driving circuit 10 may further include a power management integrated circuit (PMIC) 6, a touch power integrated circuit (TPIC) 7, a microcontroller unit (MCU)) 8 and a touch sensing unit 51. The source driving circuit 5 and the touch sensing unit 51 constitute a touch & display integrated circuit (T&D IC) 50. The touch power integrated circuit 7 is coupled to the microcontroller unit 8, the gate driving circuit 4 and the touch & display integrated circuit 50. The microcontroller unit 8 is coupled to the timing controller 2 and the touch & display integrated circuit 50.

In the embodiment of the present disclosure, the touch & display integrated circuit 50 may couple the data lines to the source driving circuit 5 or to a common electrode in the touch display panel 9 according to the display signal or the touch signal. As an example, the common electrode is divided into a plurality of sub-electrodes arranged in an array (e.g., the touch electrodes 11 in FIG. 1), which are coupled to the touch & display integrated circuit 50 through wirings.

In an exemplary embodiment of the present disclosure, the touch display device 100 may be an in-cell touch display device. For example, the touch display device 100 may include a mobile phone, a tablet computer, an electronic reading paper, an outdoor display screen, etc. with an in-cell touching function, which is not specifically limited in the present disclosure.

Embodiments of the present disclosure also provide a driving method for a touch display device. The driving method can be performed by the driving circuit 10 described in the above embodiments.

Figure 19:
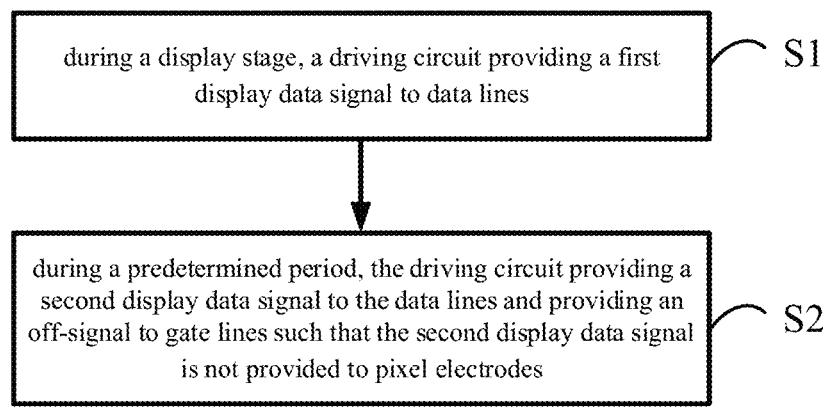
FIG. 19 shows a flowchart of a driving method for a touch display device according to an embodiment of the present disclosure.

FIG. 19 shows a flowchart of a driving method for a touch display device according to an embodiment of the present disclosure. As shown in FIG. 19, the driving method 1900 may include steps S1 and S2.

At step S1, during a display stage of the touch display device, a driving circuit provides a first display data signal to data lines.

At step S2, during a predetermined period adjacent to the display stage within a touch stage of the touch display device, the driving circuit provides a second display data signal to the data lines and provides an off-signal to gate lines such that the second display data signal is not provided to pixel electrodes.

The driving method 1900 is described in more detail below.

In this embodiment of the present disclosure, as described above with reference to the embodiment of FIG. 4, a main controller 1 may provide a display signal DP to the timing controller 2 and a control signal EN to a gate driving control circuit 3. The timing controller 2 may generate a display data signal DPD based on the display signal DP, generate a start signal STV, a clock signal CPV and an output enable signal OE for the gate driving circuit 4, and provide the clock signal CPV and the output enable signal OE to the gate driving control circuit 3.

In an embodiment of the present disclosure, as described above, the display data signal DPD may include a first display data signal DPD1 and a second display data signal DPD2. The first display data signal DPD1 is a display data signal provided by the driving circuit 10 to the data lines DL during the display stage T1. The second display data signal DPD2 is a display data signal provided by the driving circuit 10 to the data lines DL during the predetermined period T. For a detailed description of the display data signal DPD, the first display data signal DPD1 and the second display data signal DPD2, reference may be made to the above descriptions of FIGS. 4-5, and details are not repeated here.

In an embodiment of the present disclosure, more specifically, step S1 may include: during the display stage T1, the timing controller 2 provides the first display data signal DPD1 to a source driving circuit 5, the source driving circuit 5 provides the first display data signal DPD1 to the data lines DL, and the gate driving control circuit 3 provides the clock signal CPV and the at least one output enable signal OE to the gate driving circuit 4, such that the gate driving circuit 4 generate a gate control signal GO as an on-signal based on the start signal STV, the clock signal CPV and the at least one output enable signal OE and provide the on-signal to the gate lines GL.

In an embodiment of the present disclosure, more specifically, step S2 may include: during the predetermined period T adjacent to the display stage T1 within the touch stage T2, the timing controller 2 provides the second display data signal DPD2 to the source driving circuit 5, the source driving circuit 5 provides the second display data signal DPD2 to the data lines DL, and the gate driving control circuit 3 provides the control signal EN to the gate driving circuit 4, such that the gate driving circuit 4 generates a gate control signal GO as an off-signal based on the control signal EN and provides the off-signal to the gate lines GL.

In the embodiment of the present disclosure, during the display stage T1, the control signal EN is at a first level V1, such that the clock signal CPV and the at least one output enable signal OE can be provided to the gate driving circuit 4, thereby enabling the gate driving circuit 4 to output the on-signal. During the predetermined period T, the control signal EN is at a second level V2, such that the gate driving circuit 4 can output the off-signal.

Referring to the timing diagrams shown in FIGS. 5 and 15, as an example, the first level V1 may be a high level, and the second level V2 may be a low level. It should be understood that the first level V1 may be a low level, and the second level V2 may be a high level. Those skilled in the art can adjust a level state of the control signal EN according to a level state of the on-signal output by the gate driving circuit 4.

In an embodiment of the present disclosure, the at least one output enable signal may include one output enable signal OE, and a structure of the driving circuit 10 thus obtained is shown in FIG. 7. In this case, the gate driving control circuit 3 may include a first selection circuit 31 and a second selection circuit 32. It should be noted that, in this case, the control signal EN output by the main controller 1 may include a control signal EN1 and a control signal EN2. Since the control signals EN1 and EN2 are identical, they are collectively referred to as the control signal EN hereinafter.

In an exemplary embodiment of the present disclosure, the first selection circuit 31 may include an AND gate or a multiplexer. The second selection circuit 32 may include an AND gate or a multiplexer.

When both the first selection circuit 31 and the second selection circuit 32 include an AND gate, a structure of the driving circuit 10 thus obtained is shown in FIG. 8. The driving method for the touch display device performed using the driving circuit 10 shown in FIG. 8 will be described below with reference to FIG. 5.

During the display stage T1, the timing controller 2 generates the first display data signal DPD1 based on the display signal DP, and provides the first display data signal DPD1 to the source driving circuit 5 under a control of a data enable signal DE.

In addition, during the display stage T1, the control signal EN is at a high level. The clock signal CPV and the output enable signal OE are at a high level. A first input terminal and a second input terminal of a first AND gate 31 respectively receive a high level signal, and then an output terminal of the first AND gate 31 outputs a high level. A first input terminal and a second input terminal of a second AND gate 32 respectively receive a high level signal, and then an output terminal of the second AND gate 32 outputs a high level signal. The gate driving circuit 4 receives the high level signal and thus can output the on-signal.

During the predetermined period T before and after the display stage T1, the timing controller 2 generates the second display data signal DPD2 based on the display signal DP, and provides the second display data signal DPD2 to the source driving circuit 5 under the control of the data enable signal DE.

In addition, during the predetermined period T, the control signal EN is at a low level. In this case, the output terminals of the first AND gate 31 and the second AND gate 32 output a low level signal. The gate driving circuit 4 receives the low level signal and thus can output the off-signal.

When both the first selection circuit 31 and the second selection circuit 32 include a multiplexer, a structure of the driving circuit 10 is as shown in FIG. 9. The driving method for the touch display device performed using the driving circuit 10 shown in FIG. 9 will be described below with reference to FIG. 5. It should be noted that, in an exemplary embodiment of the present disclosure, the first and second multiplexers 31, 32 are configured to, from a output terminal, output an input signal from a first input terminal when a high level is input to a selection terminal, and from the output terminal, output an input signal from a second input terminal when a low level is input to the selection terminal.

During the display stage T1, the timing controller 2 generates the first display data signal DPD1 based on the display signal DP, and provides the first display data signal DPD1 to the source driving circuit 5 under the control of the data enable signal DE.

The first input terminal of the first multiplexer 31 receives the clock signal CPV, the second input terminal thereof receives the control signal EN, and the selection terminal thereof receives a selection signal S. The first input terminal of the second multiplexer 32 receives the output enable signal OE, the second input terminal thereof receives the control signal EN, and the selection terminal thereof receives the selection signal S. During the display stage T1, the selection signal S is at a high level. Therefore, the output terminal of the first multiplexer 31 outputs the input signal, i.e., the clock signal CPV, from the first input terminal, and the output terminal of the second multiplexer 32 outputs the input signal, i.e., the output enable signal OE, from the first input terminal. The gate driving circuit 4 receives the clock signal CPV and the output enable signal OE, thereby enabling to output the on-signal.

During the predetermined period T before and after the display stage T1, the timing controller 2 generates the second display data signal DPD2 based on the display signal DP, and provides the second display data signal DPD2 to the source driving circuit 5 under the control of the data enable signal DE.

In addition, during the predetermined period T, the selection signal S is at a low level. Therefore, the output terminals of the first multiplexer 31 and the second multiplexer 32 both output the input signal from the second input terminal, i.e., the control signal EN. During a first period T, the control signal EN is at a low level and is provided to the gate driving circuit 4 such that the gate driving circuit 4 can output the off-signal.

In an alternative embodiment of the present disclosure, the at least one output enable signal may include a first output enable signal OE1 and a second output enable signal OE2, and a structure of the driving circuit 10 thus obtained is shown in FIG. 13. In this case, the gate driving control circuit 3 may include a first selection circuit 31, a second selection circuit 32 and a third selection circuit 33. In the embodiment of the present disclosure, the first output enable signal OE1 is configured to control the gate driving circuit 3 to provide an on-signal to the gate lines GL for the pixels in odd rows; the second output enable signal OE2 is configured to control the gate driving circuit 3 to provide an on-signal to the gate lines GL for the pixels in even rows. It should be noted that, in this case, the control signal EN output by the main controller 1 may include a control signal EN1, a control signal EN2 and a control signal EN3. Since the control signals EN1, EN2 and EN3 are identical, they are collectively referred to as the control signal EN hereinafter.

In an exemplary embodiment of the present disclosure, the first selection circuit 31, the second selection circuit 32 and the third selection circuit 33 may each include an AND gate or a multiplexer.

When the first selection circuit 31, the second selection circuit 32 and the third selection circuit 33 all include an AND gate, a structure of the driving circuit 10 is shown in FIG. 14. The driving method for the touch display device performed using the driving circuit 10 shown in FIG. 14 will be described below with reference to FIG. 15.

During the display stage T1, the timing controller 2 generates the first display data signal DPD1 based on the display signal DP, and provides the first display data signal DPD1 to the source driving circuit 5 under the control of the data enable signal DE.

In addition, during the display stage T1, the control signal EN is at a high level. The clock signal CPV, the first output enable signal OE1 and the second output enable signal OE2 are at a high level. The first and second input terminals of the first AND gate 31, the second AND gate 32 and the third AND gate 33 all receive a high level signal, and then the output terminals of the first AND gate 31, the second AND gate 32 and the third AND gate 33 all output the high level signal. As a result, during the display stage T1, the gate driving circuit 4 receives the high level signal and thus can output the on-signal.

During the predetermined period T before and after the display stage T1, the timing controller 2 generates the second display data signal DPD2 based on the display signal DP, and provides the second display data signal DPD2 to the source driving circuit 5 under the control of the data enable signal DE.

In addition, during the predetermined period T, the control signal EN is at a low level. In this case, the output terminals of the first AND gate 31, the second AND gate 32, and the third AND gate 33 output a low level signal. The gate driving circuit 4 receives the low level signal and thus can output the off-signal.

When the first selection circuit 31, the second selection circuit 32 and the third selection circuit 33 all include a multiplexer, a structure of the driving circuit 10 is shown in FIG. 16. The driving method for the touch display device performed using the driving circuit 10 shown in FIG. 16 will be described below with reference to FIG. 15. It should be noted that, in an exemplary embodiment of the present disclosure, the first, second, and third multiplexers 31, 32, and 33 are configured to, from an output terminal, output an input signal from an first input terminal when a high level is input to a selection terminal, and from the output terminal, output an input signal from an second input terminal when a low level is input to the selection terminal.

During the display stage T1, the timing controller 2 generates the first display data signal DPD1 based on the display signal DP, and provides the first display data signal DPD1 to the source driving circuit 5 under the control of the data enable signal DE.

A first input terminal of the first multiplexer 31 receives the clock signal CPV, a second input terminal thereof receives the control signal EN, and a selection terminal thereof receives a selection signal S. A first input terminal of the second multiplexer 32 receives the first output enable signal OE1, a second input terminal thereof receives the control signal EN, and a selection terminal thereof receives the selection signal S. A first input terminal of the third multiplexer 33 receives the second output enable signal OE2, a second input terminal thereof receives the control signal EN, and a selection terminal thereof receives the selection signal S. During the display stage T1, the selection signal S is at a high level. Therefore, the output terminal of the first multiplexer 31 outputs the input signal, i.e., the clock signal CPV, from the first input terminal, the output terminal of the second multiplexer 32 outputs the input signal, i.e., the first output enable signal OE1 from the first input terminal, and the output terminal of the third multiplexer 33 outputs the input signal, i.e., the second output enable signal OE2, from the first input terminal. The gate driving circuit 4 receives the clock signal CPV, the first output enable signal OE1 and the second output enable signal OE2 and outputs the on-signal.

During the predetermined period T before and after the display stage T1, the timing controller 2 generates the second display data signal DPD2 based on the display signal DP, and provides the second display data signal DPD2 to the source driving circuit 5 under the control of the data enable signal DE.

In addition, during the predetermined period T, the selection signal S is at a low level. Therefore, the output terminals of the first multiplexer 31, the second multiplexer 32 and the third multiplexer 33 all output the input signal, i.e., the control signal EN, from the second input terminals. During the first period T, the control signal EN is at a low level and is provided to the gate driving circuit 4 such that the gate driving circuit 4 can output the off-signal.

As other alternative embodiments, the first selection circuit 3, the second selection circuit 32, and the third selection circuit 33 may respectively include different structures, such as an AND gate or a multiplexer, such that various different embodiments can be obtained. For descriptions of the driving methods and corresponding signals using the AND gate or the multiplexer in other various embodiments, reference may be made to the embodiments described with respect to FIGS. 13-17, and details are not repeated here.

In an exemplary embodiment of the present disclosure, the predetermined period T may be a time required for scanning N rows of pixels of the touch display device 100. N is an integer greater than or equal to 4.

In an embodiment of the present disclosure, when the display refresh frequency of the touch display device 100 is 60n Hz. N may be 4n, and n is an integer greater than 0.

As an example, when the display refresh frequency of the touch display device 100 is 60 Hz, N may be 4. As another example, when the display refresh frequency of the touch display device 100 is 120 Hz, N may be 8. As yet another example, when the display refresh frequency of the touch display device 100 is 180 Hz, N may be 12. As yet another example, when the display refresh frequency of the touch display device 100 is 240 Hz, N may be 16.

In an exemplary alternative embodiment of the present disclosure, a period for the display stage T1 may include a time required for scanning at least 135 rows of pixels of the touch display device 100. As an example, when the period for the display stage T1 may include the time required for scanning 135 rows of pixels of the touch display device 100, the predetermined period T may be a time required for scanning 4 rows of pixels of the touch display device 100. As another example, the period for the display stage T1 may include a time required for scanning 180 rows of pixels of the touch display device 100, and the predetermined period T may be a time required for scanning 4 rows of pixels of the touch display device 100.

In an embodiment of the present disclosure, the second display data signal DPD2 may remain constant during the predetermined period T. In an exemplary embodiment of the present disclosure, the second display data signal DPD2 during the predetermined period T may be the same as the first display data signal DPD1 during a period for scanning one row of pixels of the touch display device 100 which is adjacent to the predetermined period T within a neighboring display stage T1. It can be understood that the second display data signal DPD2 during the predetermined period T may also be the same as the first display data signal DPD1 during a period for scanning any one row of pixels which is within a neighboring display stage T1. For a more detailed description of this embodiment, reference may be made to the above-described embodiment of the driving circuit 10, which will not be repeated here.

In an alternative embodiment of the present disclosure, the second display data signal during the predetermined period is the same as the first display data signal during a first period which is adjacent to the predetermined period within a neighboring display stage. The first period is equal to the predetermined period.

As an example, the second display data signals DPD2 for N rows of pixels sequentially provided during the predetermined period T are, respectively, the same as the first display data signals DPD1 for N rows of pixels sequentially provided within the first period which is adjacent to the predetermined period T within the neighboring display stage T1. For a more detailed description of this alternative embodiment, reference may be made to the above-described embodiment of the driving circuit 10, which will not be repeated here.

In addition, it should be understood that a period for the touch stage T2 is not specifically limited in the present disclosure, and those skilled in the art can limit it according to actual touch requirements. Optionally, the period for the touch stage T2 may be the same as the period for the display stage T1. As an example, the period for the touch stage T2 may include a time required for scanning at least 135 rows of pixels of the touch display device 100. As an example, the period for the touch stage T2 may include a time required for scanning 135 rows of pixels of the touch display device 100.

It should be noted that, when describing the driving method for the touch display device of the embodiments of the present disclosure, the structure, signals, etc. of the driving circuit 10 in the touch display device are not described in further detail. However, those skilled in the art should understand that for the unmentioned description, reference may be made to the specific description of the structure and signals of the driving circuit 10 in the foregoing.

The foregoing description of the embodiment has been provided for purpose of illustration and description. It is not intended to be exhaustive or to limit the application. Even if not specifically shown or described, individual elements or features of a particular embodiment are generally not limited to that particular embodiment, are interchangeable when under a suitable condition, can be used in a selected embodiment and may also be varied in many ways. Such variations are not to be regarded as a departure from the application, and all such modifications are included within the scope of the application.

What is claimed is:

1. A touch display device, comprising: data lines, gate lines, pixel electrodes located within display areas defined by the data lines and the gate lines, and a driving circuit, wherein the driving circuit is configured to provide a first display data signal to the data lines during a display stage of the touch display device, and is configured to provide a second display data signal to the data lines during a predetermined period adjacent to the display stage within a touch stage of the touch display device, and provide an off-signal to the gate lines during the predetermined period such that the second display data signal is not provided to the pixel electrodes, wherein the predetermined period comprises a period adjacent to a previous display stage within the touch stage and a period adjacent to a latter display stage within the touch stage.

2. The touch display device according to claim 1, wherein the driving circuit comprises a main controller, a timing controller, a gate driving control circuit, a source driving circuit and a gate driving circuit, wherein the main controller is coupled to the timing controller and the gate driving control circuit, and is configured to generate a display signal and a control signal, provide the display signal to the timing controller, and provide the control signal to the gate driving control circuit, the timing controller is coupled to the gate driving control circuit and the source driving circuit, and is configured to generate the first display data signal based on the display signal and provide the first display data signal to the source driving circuit during the display stage, generate the second display data signal and provide the second display data signal to the source driving circuit during the predetermined period, and generate a start signal, a clock signal and at least one output enable signal for the gate driving circuit and provide the clock signal and the at least one output enable signal to the gate driving control circuit, the gate driving control circuit is coupled to the gate driving circuit, and is configured to receive the clock signal, the at least one output enable signal and the control signal, provide the clock signal and the at least one output enable signal to the gate driving circuit during the display stage, and provide the control signal to the gate driving circuit during the predetermined period, the source driving circuit is configured to provide the first display data signal to the data lines during the display stage, and provide the second display data signal to the data lines during the predetermined period, and the gate driving circuit is configured to generate an on-signal based on the clock signal and the at least one output enable signal and provide the on-signal to the gate lines during the display stage, and generate the off-signal based on the control signal and provide the off-signal to the gate lines during the predetermined period.

3. The touch display device according to claim 2, wherein the at least one output enable signal comprises single output enable signal, and the gate driving control circuit comprises a first selection circuit and a second selection circuit, wherein the first selection circuit is configured to receive the clock signal and the control signal, output the clock signal during the display stage, and output the control signal during the predetermined period, and the second selection circuit is configured to receive the output enable signal and the control signal, output the output enable signal during the display stage, and output the control signal during the predetermined period.

4. The touch display device according to claim 3, wherein the first selection circuit comprises an AND gate or a multiplexer, and the second selection circuit comprises an AND gate or a multiplexer.

5. The touch display device according to claim 2, wherein the at least one output enable signal comprises a first output enable signal and a second output enable signal, and the gate driving control circuit comprises a first selection circuit, a second selection circuit and a third selection circuit, wherein the first selection circuit is configured to receive the clock signal and the control signal, output the clock signal during the display stage, and output the control signal during the predetermined period, the second selection circuit is configured to receive the first output enable signal and the control signal, output the first output enable signal during the display stage, and output the control signal during the predetermined period, and the third selection circuit is configured to receive the second output enable signal and the control signal, output the second output enable signal during the display stage, and output the control signal during the predetermined period.

6. The touch display device according to claim 5, wherein the first selection circuit, the second selection circuit and the third selection circuit each comprises an AND gate or a multiplexer.

7. The touch display device according to claim 1, wherein the predetermined period is a time required for scanning N rows of pixels of the touch display device, and N is an integer greater than or equal to 4.

8. The touch display device according to claim 7, wherein the second display data signal remains constant during the predetermined period.

9. The touch display device according to claim 8, wherein the second display data signal during the predetermined period is the same as the first display data signal during a period for scanning one row of pixels of the touch display device which is adjacent to the predetermined period within a neighboring display stage.

10. The touch display device according to claim 7, wherein the second display data signal during the predetermined period is the same as the first display data signal during a first period which is adjacent to the predetermined period within a neighboring display stage, and wherein the first period is equal to the predetermined period.

11. The touch display device according to claim 7, wherein when a display refresh frequency of the touch display device is 60n Hz, N is 4n, and n is an integer greater than 0.

12. The touch display device according to claim 1, wherein the touch display device is an in-cell touch display device.

13. A driving method for a touch display device, the touch display device comprising: data lines, gate lines, pixel electrodes located within display areas defined by the data lines and the gate lines, and a driving circuit, the driving method comprises:

during a display stage of the touch display device, the driving circuit providing a first display data signal to the data lines, and during a predetermined period adjacent to the display stage within a touch stage of the touch display device, the driving circuit providing a second display data signal to the data lines and providing an off-signal to the gate lines such that the second display data signal is not provided to the pixel electrodes, wherein the predetermined period comprises a period adjacent to a previous display stage within the touch stage and a period adjacent to a latter display stage within the touch stage.

14. The driving method according to claim 13, wherein the driving circuit comprises a main controller, a timing controller, a gate driving control circuit, a source driving circuit and a gate driving circuit, wherein, during the display stage and the predetermined period, the main controller provides a display signal to the timing controller and a control signal to the gate driving control circuit, the timing controller generates the first display data signal during the display stage and generates the second display data signal during the predetermined period based on the display signal, generates a start signal, a clock signal and at least one output enable signal for the gate driving circuit, and provides the clock signal and the at least one output enable signal to the gate driving control circuit, wherein, during the display stage, the driving circuit providing a first display data signal to the data lines comprises: during the display stage, the timing controller provides the first display data signal to the source driving circuit, the source driving circuit provides the first display data signal to the data lines, the gate driving control circuit provides the clock signal and the at least one output enable signal to the gate driving circuit, and the gate driving circuit generates an on-signal based on the start signal, the clock signal and the at least one output enable signal and provides the on-signal to the gate lines, during the predetermined period, the driving circuit providing a second display data signal to the data lines and providing an off-signal to the gate lines such that the second display data signal is not provided to the pixel electrodes comprises: during the predetermined period, the timing controller provides the second display data signal to the source driving circuit, the source driving circuit provides the second display data signal to the data lines, the gate driving control circuit provides the control signal to the gate driving circuit, and the gate driving circuit generates the off-signal based on the control signal and provides the off-signal to the gate lines.

15. The driving method according to claim 14, wherein, during the display stage, the control signal is at a first level, such that the gate driving control circuit provides the clock signal and the at least one output enable signal to the gate driving circuit, and the gate driving circuit generates the on-signal based on the clock signal and the at least one output enable signal and provides the on-signal to the gate lines, during the predetermined period, the control signal is at a second level, such that the gate driving circuit generates the off-signal based on the control signal and provides the off-signal to the gate lines.

16. The driving method according to claim 15, wherein, in the case where the gate driving control circuit comprises only a multiplexer, the control signal is at the second level during the display stage and the predetermined period.

17. The driving method according to claim 13, wherein the predetermined period is a time required for scanning N rows of pixels of the touch display device, and N is an integer greater than or equal to 4.

18. The driving method according to claim 17, wherein the second display data signal remains constant during the predetermined period.

19. The driving method according to claim 18, wherein the second display data signal during the predetermined period is the same as the first display data signal during a period for scanning one row of pixels of the touch display device which is adjacent to the predetermined period within a neighboring display stage.

20. The driving method according to claim 17, wherein the second display data signal during the predetermined period is the same as the first display data signal during a first period which is adjacent to the predetermined period within a neighboring display stage, and wherein the first period is equal to the predetermined period.

* * * * *